United States Patent
Scheuble et al.

Patent Number: 5,516,454
Date of Patent: *May 14, 1996

[54] SUPERTWIST LIQUID CRYSTAL DISPLAY

[75] Inventors: Bernhard Scheuble, Seeheim-Jugenheim, Germany; Takamasa Oyama, Yamato, Japan; Georg Weber, Erzhausen, Germany; Herbert Plach, Darmstadt, Germany; Hans-Adolf Kurmeier, Seeheim-Jugenheim, Germany; Volker Reiffenrath, Rossdorf, Germany

[73] Assignee: Merck Patent Gesellschaft Mit Beschrankter Haftung, Darmstadt, Germany

[*] Notice: The term of this patent shall not extend beyond the expiration date of Pat. No. 5,308,538.

[21] Appl. No.: 283,184

[22] Filed: Aug. 3, 1994

Related U.S. Application Data

[63] Continuation of Ser. No. 982,114, Nov. 25, 1992, abandoned, which is a continuation of Ser. No. 585,131, filed as PCT/EP90/00936, Jun. 15, 1990, abandoned.

[30] Foreign Application Priority Data

Jul. 13, 1989 [DE] Germany .......................... 39 23 064.3

[51] Int. Cl.⁶ .......................... C09K 19/52; C09K 19/30; G02F 1/13
[52] U.S. Cl. .......................... 252/299.01; 252/259.61; 252/299.63; 252/299.64; 252/299.65; 359/103
[58] Field of Search .......................... 252/299.01, 299.61, 252/299.63, 299.64, 299.65

[56] References Cited

U.S. PATENT DOCUMENTS

| | | | |
|---|---|---|---|
| 4,705,905 | 11/1987 | Takatsu et al. | 252/299.61 |
| 4,799,774 | 1/1989 | Baur et al. | 359/103 |
| 4,839,091 | 6/1989 | Goto et al. | 252/299.63 |
| 5,013,477 | 5/1991 | Buchecker et al. | 252/299.63 |
| 5,164,114 | 11/1992 | Kurmeier et al. | 252/299.61 |
| 5,178,790 | 1/1993 | Weber et al. | 252/299.01 |
| 5,286,410 | 2/1994 | Weber et al. | 252/299.61 |
| 5,308,538 | 5/1994 | Weber et al. | 252/299.61 |
| 5,374,374 | 12/1994 | Weber et al. | 252/299.63 |

FOREIGN PATENT DOCUMENTS

| | | |
|---|---|---|
| 0261614 | 3/1988 | European Pat. Off. |
| 0366985 | 5/1990 | European Pat. Off. |
| 0365962 | 5/1990 | European Pat. Off. |
| 8903867 | 5/1989 | WIPO |
| 8908692 | 9/1989 | WIPO |

Primary Examiner—Shean C. Wu
Attorney, Agent, or Firm—Millen, White, Zelano, & Branigan

[57] ABSTRACT

Supertwist liquid crystal displays having outstanding properties are obtained if the nematic liquid crystal mixture is based on components selected from group A comprising compounds of the formulae IIa to IIk:

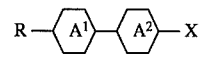

IIa

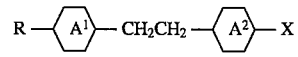

IIb

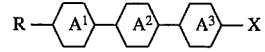

IIc

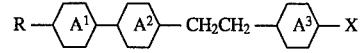

IId

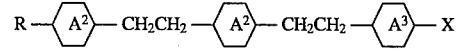

IIe

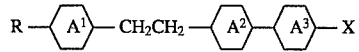

IIf

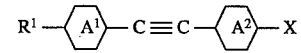

IIg

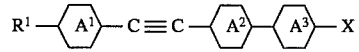

IIh

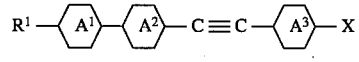

IIi

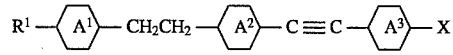

IIj

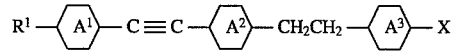

IIk

10 Claims, No Drawings

SUPERTWIST LIQUID CRYSTAL DISPLAY

This application is a continuation, of application Ser. No. 07/982,114, filed Nov. 25, 1992 now abandoned which is a continuation, of application Ser. No. 07/585,131, filed PCT/EP90/00936, Jun. 15, 1990 now abandoned.

FIELD OF THE INVENTION

The invention relates to supertwist liquid crystal displays (SLD) having very short switching times and good steepness and angle dependence, and also to the novel nematic liquid crystal mixtures used therein.

BACKGROUND OF THE INVENTION

SLD according to the preamble are known, for example from EP 0,131,216 B1; DE 3,423,993 A1; EP 0,098,070 A2; M. Schadt and F. Leenhouts, 17th Freiburger Arbeitstagung Flüssigkristalle [Freiburg Working Meeting on Liquid Crystals] (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, volume 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters volume 4 (1), pages 1–8 (1986). The term SLD here comprises any more highly twisted display element with an amount of twist angle between 100° and 600°, such as, for example, the display elements according to Waters et al. (C. M. Waters et al., Proc. Soc. Inf. Disp. (New York) (1985) (3rd Intern. Display Conference, Kobe, Japan), the STN-LCD (German Offenlegungsschrift 3,503,259), SBE-LCD (T. J. Scheffer and J. Nehring, Appl. Phys. Lett. 45 (1984) 1021), OMI-LCD (M. Schadt and F. Leenhouts, Appl. Phys. Lett. 50 (1987), 236, DST-LCD (European Published Application 0,246,842) or BW-STN-LCD (K. Kawasaki et al., SID 87 Digest 391 (20.6)).

SUMMARY OF THE INVENTION

Compared with standard twisted nematic displays, SLD of this type are distinguished by substantially better steepness of the electro-optical characteristic and thus associated better contrast values and by a substantially smaller angle dependence of the contrast. SLD with very short switching times are here of particular interest, especially also at relatively low temperatures. To achieve short switching times, the viscosities of the liquid crystal mixtures have hitherto been optimized with the use of, in most cases, monotropic additives having a relatively high vapour pressure. However, the switching times achieved were not adequate for some applications.

To achieve a steep electro-optical characteristic, the liquid crystal mixtures should have relatively high wide (sic) values for $K_3/K_1$ and relatively small values for $\Delta\epsilon/\epsilon_\perp$.

Beyond the optimization of the contrast and switching times, mixtures of this type have to meet further important demands:

1. a wide d/p window
2. a high chemical fatigue stability
3. a high electrical resistance
4. a low frequency dependence of the threshold voltage.

The parameter combinations achieved are not yet nearly sufficient, in particular for high-multiplex STN (1/400). In part, this is to be ascribed to the fact that the various demands are affected in opposite directions by material parameters.

There is thus still a great demand for SLD which have very short switching times coupled with, at the same time, a wide range of working temperatures, high steepness of the characteristic, good angle dependence of the contrast and low threshold voltage and which meet the demands given above.

The invention is based on the object of providing SLD which show the above-indicated disadvantages only to a smaller extent or not at all and, at the same time, have very short switching times.

It has now been found that this object can be achieved if the nematic liquid crystal mixture a) is based on component A containing one or more compounds selected from group A comprising compounds of the formulae IIa to IIk:

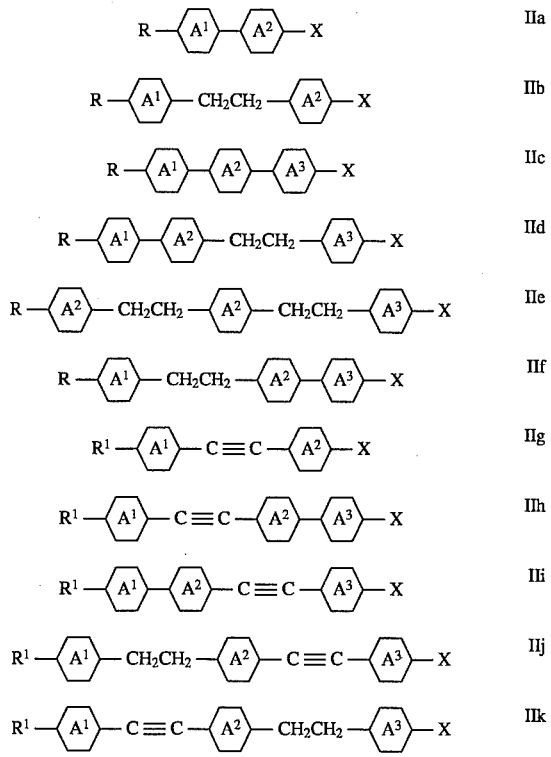

in which

R is n-alkyl or n-alkenyl having up to 9 C atoms,

X is cyano, —NCS, F, Cl, —CF$_3$, —CHF$_2$, —OCF$_3$, —OCHF$_2$, —OCF$_2$CF$_2$H or —OC$_2$F$_5$, and the rings A$^1$, A$^2$ and A$^3$ each independently of one another are 1,4-phenylene, 2- or 3-fluoro-1,4-phenylene or trans-1,4-cyclohexylene, or one of the rings A$^1$, A$^2$ and A$^3$ can also be 1,4-cyclohexenylene, 2,3-difluoro- 1,4-phenylene, pyridine-2,5-diyl or pyrimidine-2,5-diyl, b) contains 0–40% by weight of a liquid-crystalline component B, consisting of one or more compounds having a dielectric anisotropy of −1.5 to +1.5, of the general formula I

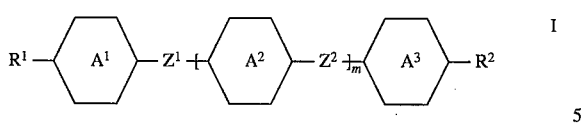

in which
R¹ and R² each independently of one another are n-alkyl, n-alkoxy, n-oxaalkyl, ω-fluoroalkyl or n-alkenyl having up to 9 C atoms, the rings A¹, A² and A³ each independently of one another are 1,4-phenylene, 2- or 3-fluoro-1,4-phenylene, trans-1,4-cyclohexylene or 1,4-cyclohexenylene, Z¹ and Z² each independently of one another are —CH₂CH₂—, —C≡C— or a single bond, and m is 0, 1 or 2, c) contains 0 to 20% by weight of a liquid-crystalline component C consisting of one or more compounds having a dielectric anistropy below −1.5, and d) contains an optically active component D in such a quantity that the ratio of cell thickness (spacing of the plane-parallel carrier plates) to the natural pitch of the chiral nematic liquid crystal mixture is approximately 0.2 to 1.7 and in particular approximately 0.2–1.3, the nematic liquid crystal mixture has a nematic phase range of at least 60° C., a viscosity of not more than 35 mPa.s and a dielectric anisotropy of at least +1, the dielectric anisotropies of the compounds and the parameters relating to the nematic liquid crystal mixture referring to a temperature of 20° C.

DETAILED DESCRIPTION

The invention thus relates to an SLD with two plane-parallel carrier plates which, with a frame, form a cell, a nematic liquid crystal mixture, located in the cell, having a positive dielectric anisotropy, electrode layers with superposed orientation layers on the insides of the carrier plates, a tilt angle of about 1 degree to 30 degrees between the longitudinal axis of the molecules at the surface of the carrier plates and the carrier plates, and a twist angle of the liquid crystal mixture in the cell from orientation layer to orientation layer of an absolute valve between 100° and 600°, characterized in that the nematic liquid crystal mixture a) is based on component A containing one or more compounds selected from group A comprising compounds of the formulae IIa to IIk:

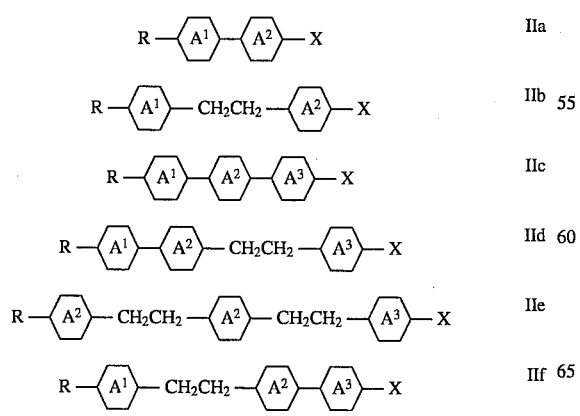

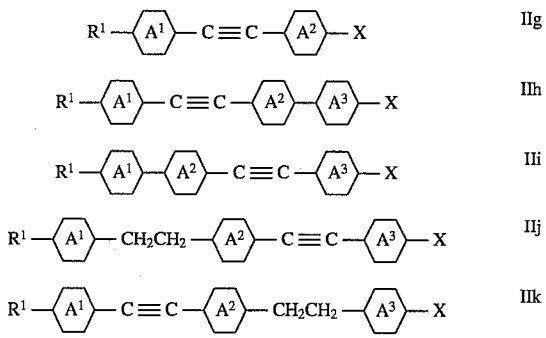

in which
R is n-alkyl or n-alkenyl having up to 9 C atoms,
X is cyano, —NCS, F, Cl, —CF₃, —CHF₂, —OCF₃, —OCHF₂, —OCF₂CF₂H or —OC₂F₅, and the rings A¹, A² and A³ each independently of one another are 1,4-phenylene, 2- or 3-fluoro-1,4-phenylene or trans-1,4-cyclohexylene, or one of the rings A¹, A² and A³ can also be 1,4-cyclohexenylene, 2,3-difluoro-1,4-phenylene, pyridine-2,5-diyl or pyrimidine-2,5-diyl, b) contains 0–40% by weight of a liquid-crystalline component B, consisting of one or more compounds having a dielectric anisotropy from −1.5 to +1.5, of the general formula I

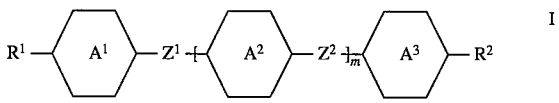

in which
R¹ and R² each independently of one another are n-alkyl, n-alkoxy, n-oxaalkyl, ω-fluoroalkyl or n-alkenyl having up to 9 C atoms, the rings A¹, A² and A³ each independently of one another are 1,4-phenylene, 2- or 3-fluoro-1,4-phenylene, trans-1,4-cyclohexylene or 1,4-cyclohexenylene, Z¹ and Z² each independently of one another are —CH₂CH₂—, —C≡C— or a single bond, and m is 0, 1 or 2, c) contains 0–20% by weight of a liquid-crystalline component C consisting of one or more compounds having a dielectric anisotropy below −1.5, and d) contains an optically active component D in such a quantity that the ratio of cell thickness (spacing of the plane-parallel carrier plates) to the natural pitch of the chiral nematic liquid crystal mixture is about 0.2 to 1.7, and in particular 0.2 to 1.3, and in that the nematic liquid crystal mixture has a nematic phase range of at least 60° C., a viscosity of not more than 35 mPa.s and a dielectric anisotropy of at least +1, the dielectric anisotropies of the compounds and the parameters relating to the nematic liquid crystal mixture referring to a temperature of 20° C.

The invention also relates to corresponding liquid crystal mixtures for use in SLD.

The individual compounds of, for example, the formulae I and IIa to IIk or also other compounds which can be used in the SLD according to the invention are either known or can be prepared analogously to the known compounds.

Preferred liquid crystal mixtures contain a) at least one component selected from group B4 comprising compounds of the formulae AI to AVI:

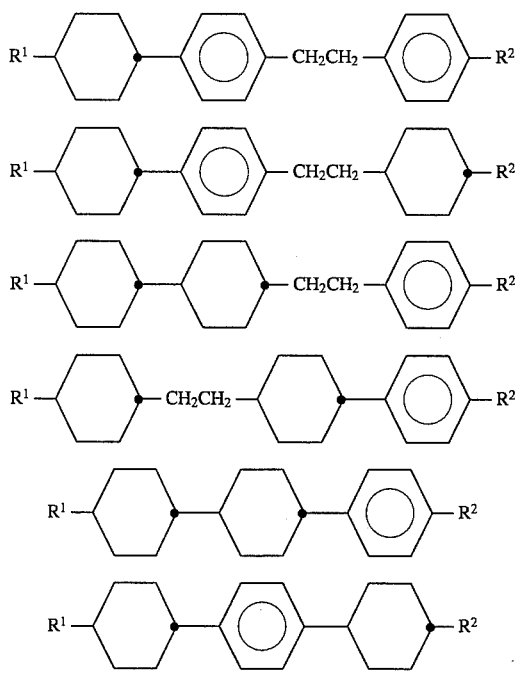

in which $R^1$ and $R^2$ each independently of one another are R and

R is alkyl having 1–12 C atoms, and in which one or two non-adjacent $CH_2$ groups can also be replaced by —O—, —CH≡CH—, —CO—, —O—CO— or —CO—O—, b) and/or at least one component selected from group B1 comprising the compounds of the formulae BI to BIV:

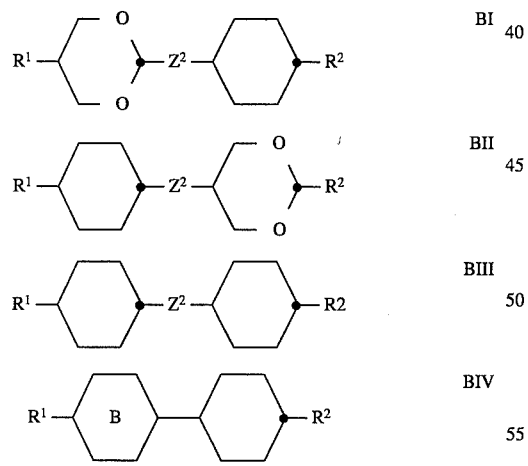

in which $R^1$ and $R^2$ each independently of one another have the meaning given for R, $Z^2$ is —$CH_2CH_2$—, —CO—O—, —O—CO— or a single bond, and is 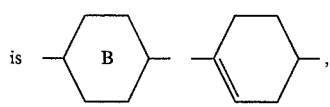, -continued

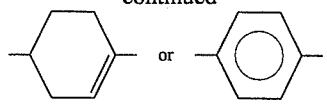

and/or at least one component selected from group B2 comprising the compounds of the formulae BV to BVII:

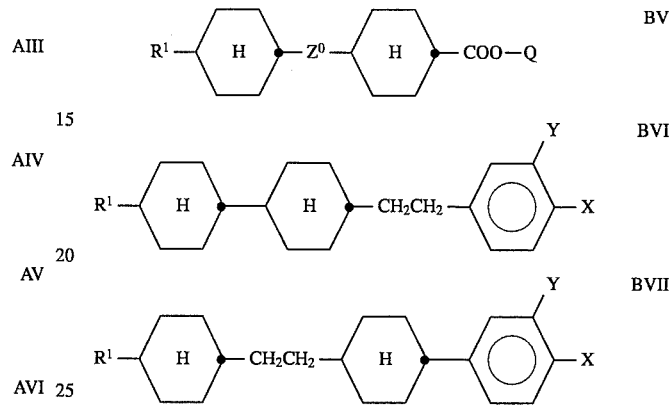

in which $R^1$ has the meaning given for R, $Z^0$ is —$CH_2CH_2$— or a single bond and Q is 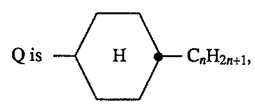

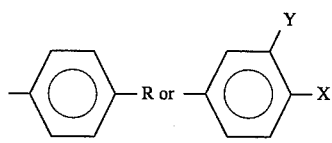

n being 1 to 9, X being CN or F and Y being H or F, and/or at least one component selected from group B3 comprising the compounds of the formulae BVIII and BIX:

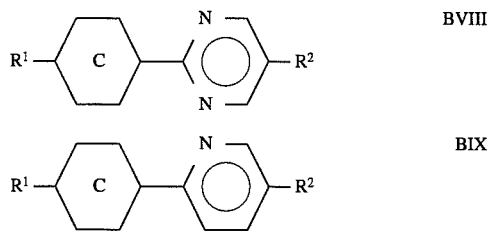

in which $R^1$ and $R^2$ each independently of one another have the meaning given for R, and is 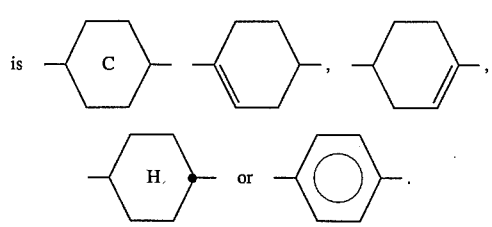.

Particularly preferred compounds of the formula BIII are those of the following partial formulae:

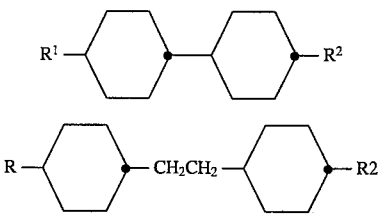

in which
R¹ is C₃—(CH₂)ₙ—O—, CH₃—(CH₂)ᵣ—, trans-H—(CH₂)ᵣ—CH=CH—(CH₂CH₂)ₛ—CH₂O— or trans-H—(CH₂)—CH=CH—(CH₂CH₂)ₛ—, R² is CH₃—(CH₂)ₜ—, n is 1, 2, 3 or 4, r is 0, 1, 2 or 3, s is 0 or 1 and t is 1, 2, 3 or 4.

Those compounds of the partial formula

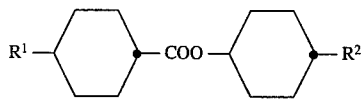

in which R¹ and R² have the meanings given above, are also preferred.

The proportion of the compounds of the formula BIII of the above-indicated partial formulae is preferably about 5% to 45%, especially preferably about 10% to 35%. Particularly preferred compounds of the formula BIV are those of the following partial formula:

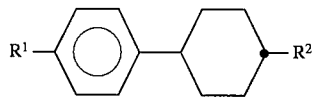

in which
R¹ is CH₃—(CH₂)ₙ—O— or trans-H—(CH₂)ᵣ—CH=CH—(CH₂CH₂)ₛ—CH₂O— and R² is CH₃—(CH₂)ₜ—, n being 1, 2, 3 or 4, r being 0, 1, 2 or 3, s being 0 or 1 and t being 1, 2, 3 or 4.

The proportion of these compounds or of the compounds of the formula BIV is preferably about 5% to 40%, especially preferably about 10% to 35%.

Preferably, the mixtures contain compounds of the formula III, in particular those of the partial formula

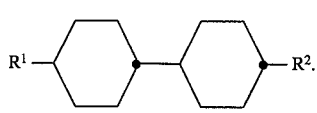

In a particularly preferred embodiment, the mixtures simultaneously contain compounds of the formulae BIII and BIV, the total proportion of components of group B1 remaining unchanged.

If compounds of the formulae BI and/or BIII are present, R¹ and R² preferably each independently of one another are n-alkyl having 1 to 7 C atoms or (trans)-n-alkenyl having 3 to 7 C atoms. Z² is preferably a single bond. BI is particularly preferred.

Those mixtures according to the invention are also preferred which contain one or more compounds of the formula BIV, in which

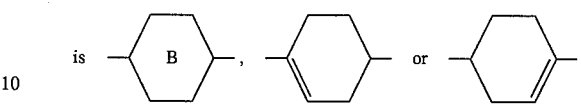

and R¹ and R² have one of the preferred meanings given above, especially preferably n-alkyl having 1 to 7 C atoms.

In any case, the total proportion of components of group B1 remains unchanged.

The proportion of compounds of group B2 is preferably about 5% to 45%, especially preferably 5% to 20%. The proportion (preferred ranges) of BV to BVII is as follows:

BV about 5% to 30%, preferably about 5% to 15% total of BVI and BVII: about 5% to 25%, preferably about 10% to 20%.

Preferred compounds of group B2 are indicated below:

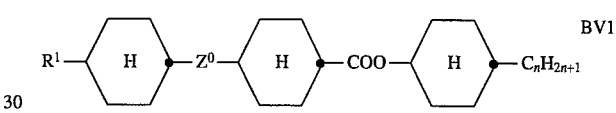

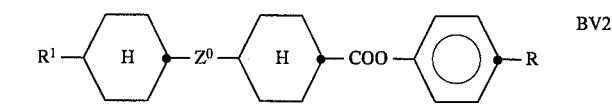

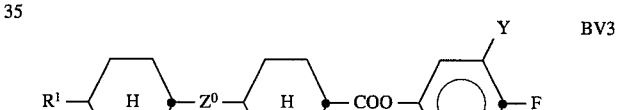

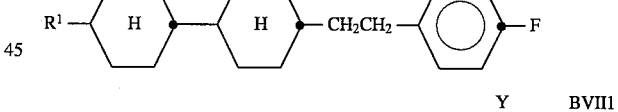

R¹ is preferably n-alkyl having 1 to 7 C atoms or (trans)-n-alkenyl having 3 to 7 C atoms. Z is preferably a single bond. R preferably has the preferred meaning given above for R¹ or is fluorine. Y is preferably fluorine.

Preferably, the mixtures according to the invention contain one or more compounds selected from the group comprising BV3, BVI 1 and BVII 1 in a total proportion of about 5 to 35%.

In a particularly preferred embodiment, the mixtures according to the invention contain, in addition to BV3, BVI1, BVII1 and BV2 (R=A), further terminally fluorinated compounds selected, for example, from the group comprising:

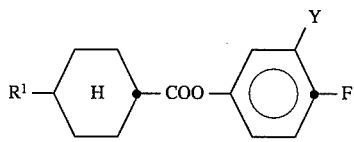

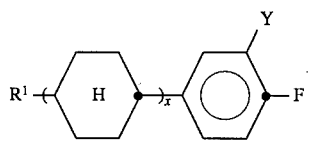

and/or polar heterocycles selected from the group comprising

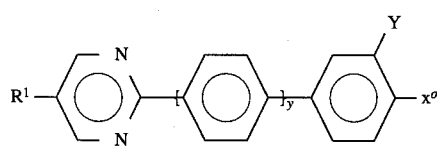

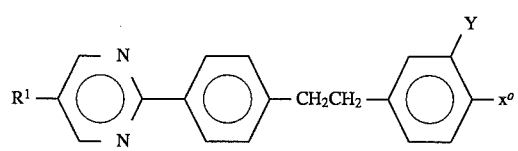

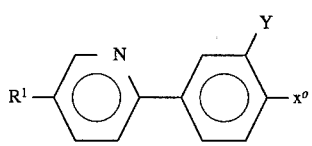

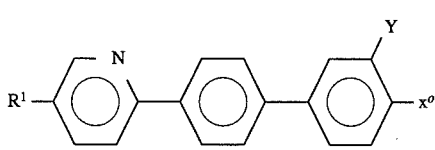

in which $R^1$ is preferably n-alkyl having 1 to 7 C atoms or (trans)-n-alkenyl having 3 to 7 C atoms, x is 1 or 2, $x^o$ is F, Cl $CF_3$, —$OCF_3$ or —$OCHF_2$, y is 0 or 1 and Y is H or F.

The total proportion of all the terminally fluorinated compounds is preferably about 5% to 65%, especially about 15% to 40%.

The proportion of the compounds from group B3 is preferably about 5% to 30%, especially preferably about 10% to 20%. $R^1$ is preferably n-alkyl or n-alkoxy each having 1 to 9 C atoms. $R^2$ is preferably n-alkyl having 1 to 9 C atoms. However, analogous compounds with alkenyl or alkenyloxy groups can also be used. Compounds of the formula BVIII are preferred.

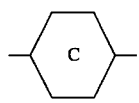

is preferably 1,4-phenylene

The mixtures according to the invention contain compounds from at least one of groups B1, B2 and B3. Preferably, they contain one or more compounds from group B1 and one or more compounds from group B2 and/or B3.

Isothiocyanates, for example of the formula

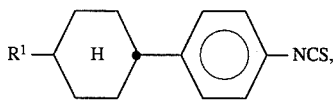

in which $R^1$ is n-alkyl having 1 to 7 C atoms or n-alkenyl having 3 to 7 C atoms, are also preferred.

In a particularly preferred embodiment, the mixtures according to the invention contain preferably about 5% to 20% of one or more compounds having a dielectric anisotropy below −1.5 (component C). Compounds of this type are known, for example derivatives of 2,3-dicyanohydroquinone or cyclohexane derivatives having the structural element

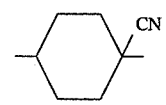

according to German Offenlegungsschrift 3,231,707 or 3,407,013.

Preferably, however, compounds having the structural element 2,3-difluoro-1,4-phenylene are selected, for example compounds according to German Offenlegungsschriften 3,807,801, 3,807,861, 3,807,863, 3,807,864 or 3,807,908. Particularly preferred are tolans having the structural element according to International Patent Application PCE/DE 88/00,133, in particular those of the formulae

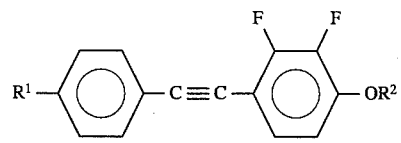

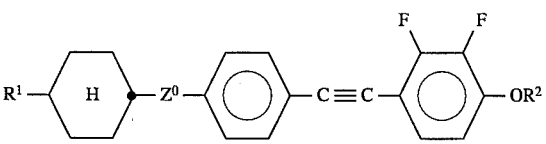

in which $R^1$ and $R^2$ each independently of one another are preferably n-alkyl having 1 to 7 C atoms or n-alkenyl having 3 to 7 C atoms and $Z^0$ is —$CH_2CH_2$— or a single bond, and phenylpyrimidine of the formula

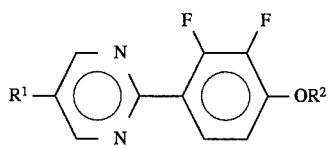

corresponding to German Offenlegungsschrift 3,807,871.

In a particularly preferred embodiment, the mixtures contain about 5% to 35%, especially preferably about 10% to 20%, of liquid-crystalline tolan compounds. As a result, it is possible to use smaller cell thicknesses (about 5–6 μm), whereby the switching times are markedly shortened. Particularly preferred tolanes are shown below:

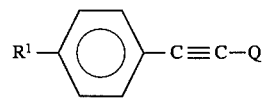

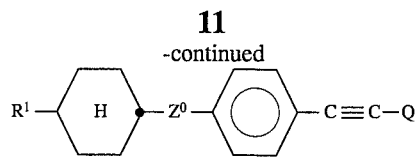

R¹ is preferably n-alkyl or n-alkoxy having 1 to 7 C atoms,

Z⁰ is —CH₂CH₂— or a single bond,

Q is

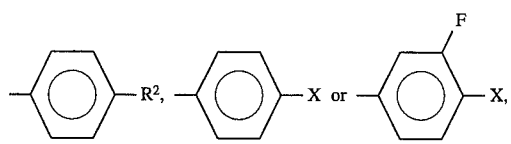

X being F, Cl or OCF₃,

R² being n-alkyl or n-alkoxy each having 1 to 7 C atoms or n-alkenyl or n-alkenyloxy each having 3 to 7 C atoms.

Further particularly preferred embodiments are given below:

- component A contains compounds of the formulae IIa to IIf, in which X is cyano, and compounds of the formulae IIa to IIf, in which X is —NCS, F, Cl, —CF₃, —CHF₂, —OCF₃, —OCHF₂, —OCF₂CF₂H or —OC₂F₅, and the proportion of the cyano compounds in component A is 0 to 50% by weight,
- component A contains one or more compounds of the formulae IIa1—IIa3 and IIc1–IIc8

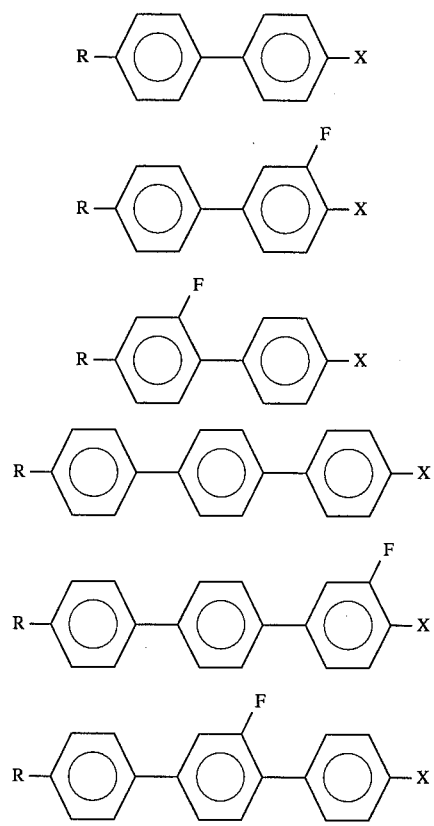

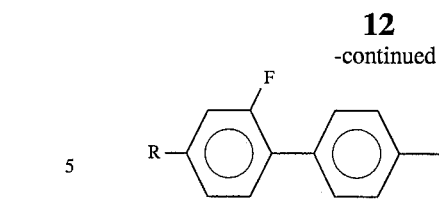

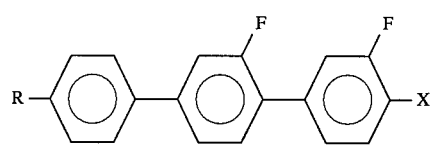

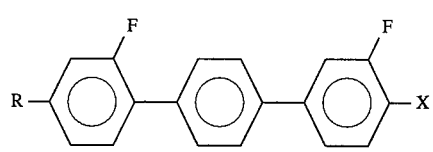

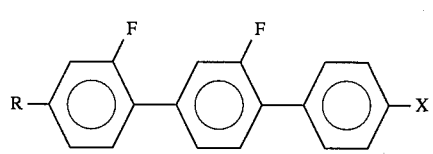

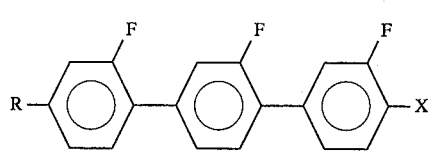

in which R is n-alkyl, n-alkoxy or n-alkenyl having 1–9 C atoms and X is F, Cl or OCF₃.

Component A contains at least one compound of the formulae IId1–IId5

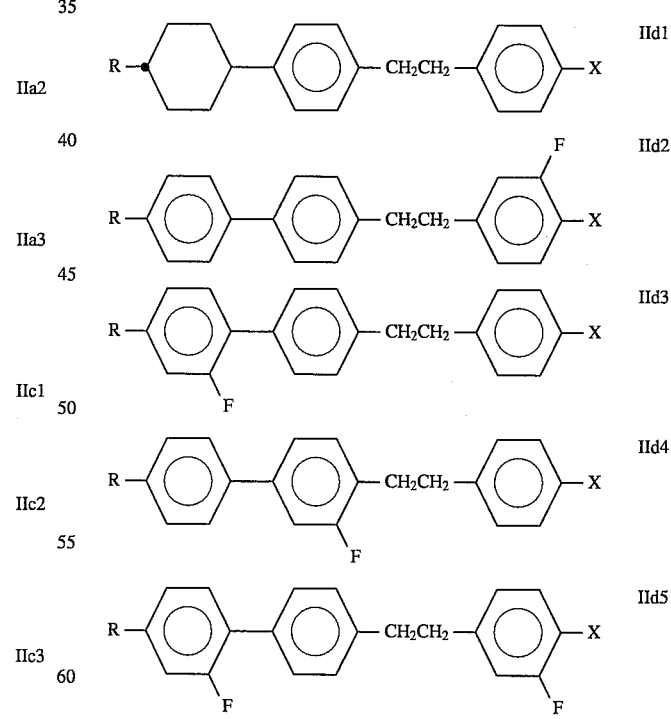

in which R is $C_nH_{2n+1}$ or $C_nH_{2n+1}$

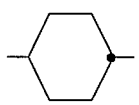

with n=1–10 and X is F, Cl or $OCF_3$ and very especially F.

Component A contains no compounds of the formulae IIa to IIf, in which X is cyano, Component A contains one or more compounds of the formula

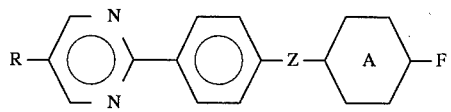

in which

R is n-alkyl, n-alkoxy or n-alkenyl having 1–9 C atoms,

Z is —$CH_2CH_2$— or a single bond and

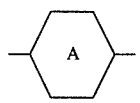

is 1,4-phenylene, 2- or 3-fluoro-1,4-phenylene or 1,4-cyclohexylene.

X is F, Cl, $CF_3$, —$OCF_3$, $OCHF_2$ or $CHF_2$, component B contains one or more compounds selected from the group comprising II1 to II7:

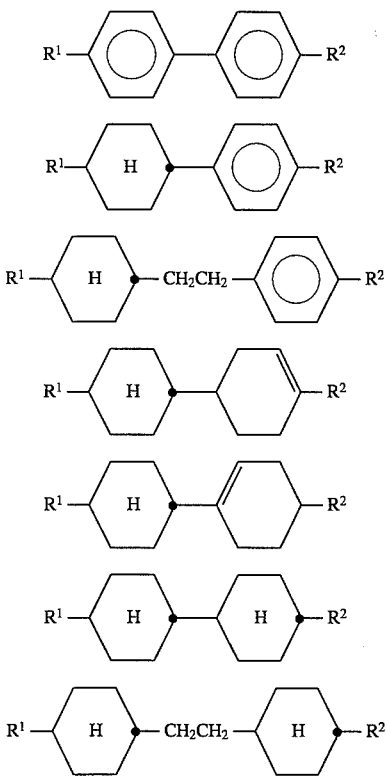

in which $R^1$ and $R^2$ have the meanings given in claim 1.

Component B additionally contains one or more compounds selected from the group comprising II8 to II20:

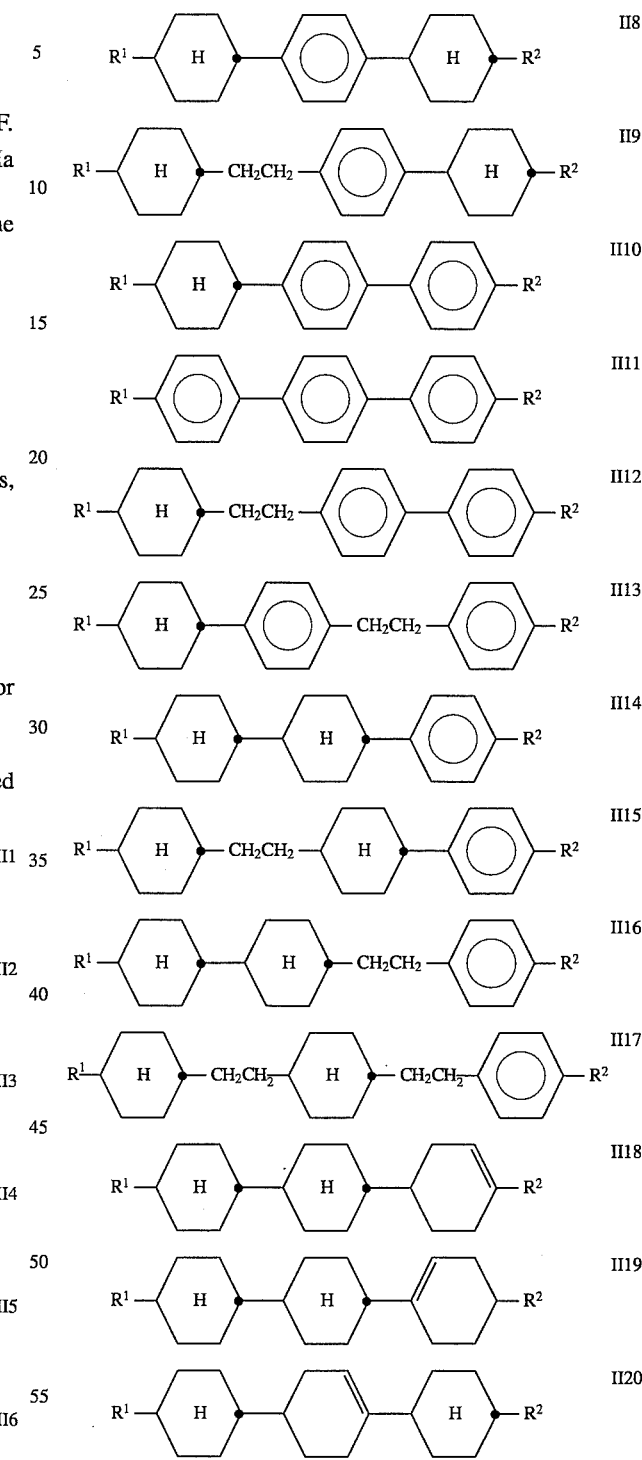

in which $R^1$ and $R^2$ have the meanings given in claim 1 and the 1,4-phenylene groups in II8 to II17 each independently of one another can also be mono- or poly-substituted by fluorine.

Component B additionally contains one or more compounds selected from the group comprising II21 to II25:

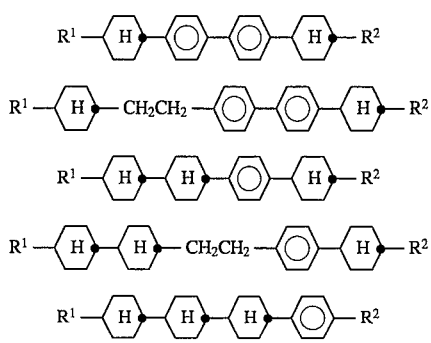

in which $R^1$ and $R^2$ have the meanings given in claim 1 and the 1,4-phenylene groups in II21 to II25 each independently of one another can also be mono- or poly-substituted by fluorine.

Component B contains one or more compounds selected from the group comprising II26 and II27:

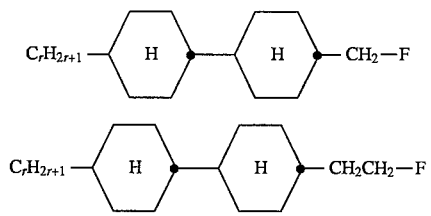

in which $C_rH_{2r+1}$ is a straight-chain alkyl group having up to 7 C atoms.

The liquid crystal mixture additionally contains, apart from components A, B and C, one or more compounds selected from the group comprising III and IV:

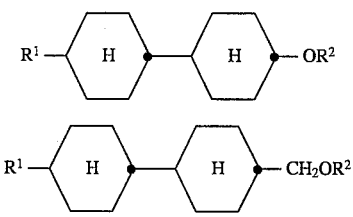

in which $R^1$ and $R^2$ have the meanings given in claim 1.

The liquid crystal mixture additionally contains, apart from components A, B and C, one or more compounds selected from the group comprising V and VI:

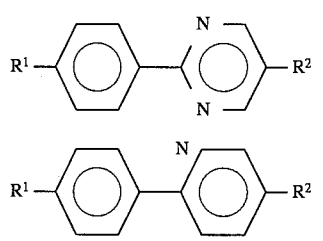

in which $R^1$ and $R^2$ have the meanings given in claim 1.

Component C contains one or more compounds selected from the group comprising VII to XI:

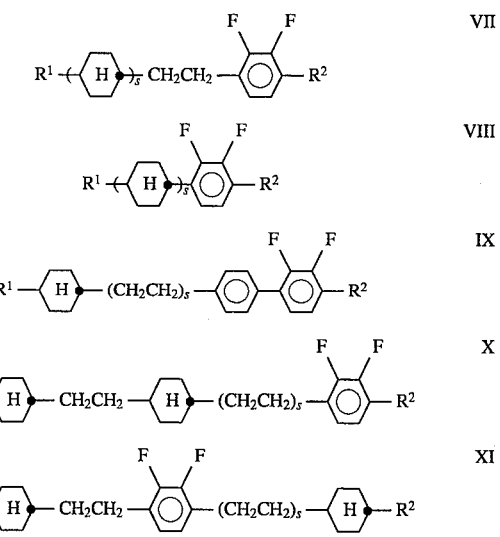

in which $R^1$ and $R^2$ have the meanings given in claim 1 and S (sic) is 0 or 1.

Component B contains one or more compounds selected from the group comprising XII to XIV:

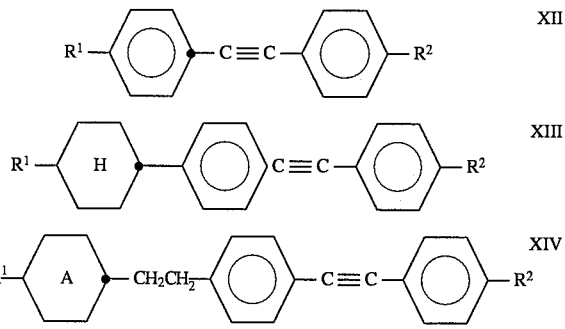

in which $R^1$ and $R^2$ have the meanings given in claim 1.

Those mixtures are preferred which exclusively contain compounds of the formulae IIa to IIh (group A) and component C, i.e. no compounds of component B.

The preferred mixtures containing terminally halogenated compounds of the formulae IIa to IIk (X=F, Cl, —CF$_3$, —CHF$_2$, —OCF$_3$ or —OCHF$_2$) shows (sic) particularly advantageous parameter combinations and, at the same time, a wide d/p window.

Liquid crystal mixtures according to the invention whose component A contains at least one compound of the formula

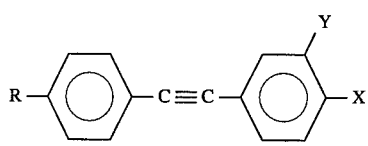

in which
R is

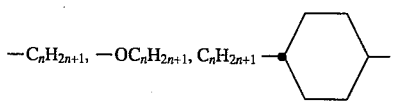

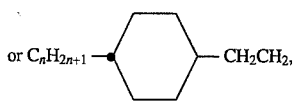

n is an integer of 1–15,

Y is H or F and

X is F, Cl or OCF$_3$, and/or contains a compound of the formulae IId2–IId5, IIa1–IIa3 and/or IIc1–IIc8, have advantageous values of the threshold voltage V$_{10/0/20}$ and of the flow viscosity η and are distinguished by fairly high or high values of the optical anisotropy. These mixtures are preferred.

For component D, a large number of chiral doping substances, some of which are commercially obtainable, are available to those skilled in the art. The choice of these is not critical per se.

The liquid crystal mixtures used in the SLD according to the invention are dielectrically positive with Δε≧1. Liquid crystal mixtures with Δε≧3 are particularly preferred, and very particularly those with Δε≧5.

The liquid crystal mixtures according to the invention have advantageous values of the threshold voltage V$_{10/0/20}$ and of the flow viscosity η. If the value of the optical path difference d Δn is given, the value of the layer thickness d is determined by the optical anisotropy Δn. Using i.a. liquid crystal mixtures according to the invention with a relatively high or high value of the optical anisotropy is preferred, especially in the case of relatively high or high values of dΔn, since the value of d can then be selected to be relatively small, which brings about more advantageous values of the switching times. However, those liquid crystal displays according to the invention which contain liquid crystal mixtures according to the invention having smaller values of Δn are also characterized by advantageous values of the switching times. The liquid crystal mixtures according to the invention are characterized further by advantageous values of the steepness of the electro-optical characteristic and can be operated at high multiplex rates. Moreover, the liquid crystal mixtures according to the invention have high stability and advantageous values of electrical resistance and of frequency dependence of the threshold voltage. The liquid crystal displays according to the invention have a wide range of working temperatures and good angle dependence of the contrast.

The structure of the liquid crystal display elements according to the invention from polarizers, electrode base plates and electrodes with such a surface treatment that the preferential orientation (director) of the adjoining liquid crystal molecules from one electrode to the other is in each case twisted usually by an amount of 160° to 360° relative to one another, corresponds to the type of construction which is conventional for such display elements. The term conventional type of construction is here used in a wide meaning and also comprises all variations and modifications of the supertwist cell, and in particular also matrix display elements and the display elements containing additional magnets according to German Offenlegungsschrift 2,748,738. The surface tilt angles at the two carrier plates can be equal or different. Equal tilt angles are preferred.

However, an essential difference between the display elements according to the invention and the hitherto conventional ones on the basis of the twisted nematic cell resides in the choice of the liquid crystal components of the liquid crystal layer.

The liquid crystal mixtures which can be used according to the invention are prepared in a manner conventional per se.

As a rule, the desired quantity of the components used in a smaller amount is dissolved in the components representing the main constituent, advantageously at an elevated temperature. It is also possible to mix solutions of the components in an organic solvent, for example in acetone, chloroform or methanol, and, after thorough mixing, to remove the solvent again, for example by distillation.

The dielectrics can also contain further additives known to those skilled in the art and described in the literature. For example, 0–15% of pleochroic dyes can be added.

The examples which follow are intended to explain the invention, without limiting it.

In the examples:

S-N is the smectic/nematic phase transition temperature, c.p. is the clearing point, visc. is the viscosity (mPa.s), T$_{on}$ is the time from switching on until 90% of the maximum contrast is reached, and T$_{off}$ is the time from switching off until 10% of the maximum contrast is reached.

The SLD is activated in multiplex operation (multiplexing ratio 1:100, bias 1:11, operating voltage 18.5 volt).

Above and below, all temperatures are given in °C. The percentage figures are percent by weight. The values of the switching times and viscosities refer to 20° C.

EXAMPLE 1

An SLD of the STN type having the following parameters:

twist angle 240° tilt angle 5° d/p 0.54 d.Δn 0.860, containing a liquid crystal mixture having the following parameters:

clearing point: 91°

Δn: 0.1254

Δε: +8.1 viscosity (20° C.): 16 mPa.s and consisting of a base mixture of

18% of p-trans-4-propylcyclohexane-benzonitrile,

8% of trans-1-p-methoxyphenyl-4-propylcyclohexane,

5% of 2-p-fluorophenyl-5-propylpyrimidine,

5% of 2-p-trifluoromethoxyphenyl-5-pentylpyrimidine,

5% of 2-p-trifluoromethoxyphenyl-5-heptylpyrimidine,

9% of p-[trans-4-(trans-4-propylcyclohexyl)-cyclohexyl]trifluoromethoxybenzene,

8% of p-[trans-4-(trans-4-pentylcyclohexyl)-cyclohexyl]-trifluoromethoxybenzene, 8% of 1-[trans-4-(trans-4-propylcyclohexyl)-cyclohexyl]-2-(p-trifluoromethoxyphenyl)-ethane, 7% of 1-[trans-4-(trans-4-pentylcyclohexyl)-cyclohexyl]-2-(p-trifluoromethoxyphenyl)-ethane, 5% of 1-[trans-4-(trans-4-propylcyclohexyl)-cyclohexyl]-2-(3,4-difluorophenyl)-ethane, 5% of 1-[trans-4-(trans-4-propylcyclohexyl)-cyclohexyl]-2-(p-fluorophenyl)-ethane, 7% of 4-trifluoromethoxy-4'-(trans-4-propylcyclohexyl)-biphenyl, 3% of 4-(trans-4-propylcyclohexyl)-4'-methoxytolan, 3% of 4-(trans-4-propylcyclohexyl)-4'-ethoxytolan and 4% of 4-(trans-4-propylcyclohexyl)-4'-propoxytolan and a chiral component (2-octyl p-(p-n-hexylbenzoyloxy)-benzoate) shows the following switching times: 105 ms (1/16 D, 1/5 b), 198 ms (1/240 D, 1/14.5 b), $V_{10/0/20}$ 2.31 volt, $V_{90/0/20}$ 2.51 volt and a Δ d/p (d/p window) of 0.21.

EXAMPLE 2

An SLD of the STN type having the following parameters:
 twist angle 240°
 tilt angle 5°
 d/p 0.56
 d. Δn 0.85,
containing a liquid crystal mixture having the following parameters:
 clearing point: 87°
 Δn: 0.1222
 Δε: +8.5
 viscosity (20° C.): 16 mPa.s
and consisting of a base mixture of
18% of p-trans-4-prooylcyclohexane-benzonitrile,
8% of trans-1-p-methoxyphenyl-4-propylcyclohexane,
5% of 2-p-fluorophenyl-5-propylpyrimidine,
5% of 2-p-trifluoromethoxyphenyl-5-pentylpyrimidine,
5% of 2-p-trifluoromethoxyphenyl-5-heptylpyrimidine,
9% of p-[trans-4-(trans-4-propylcyclohexyl)-cyclohexyl]-trifluoromethoxybenzene,
8% of p-[trans-4-(trans-4-pentylcyclohexyl)-cyclohexyl]-trifluoromethoxybenzene,
8% of 1-[trans-4-(trans-4-propylcyclohexyl)-cyclohexyl]-2-(p-trifluoromethoxyphenyl)-ethane,
7% of 1-[trans-4-(trans-4-pentylcyclohexyl)-cyclohexyl]-2-(p-trifluoromethoxyphenyl)-ethane,
5% of 1-[trans-4-(trans-4-propylcyclohexyl)-cyclohexyl]-2-(3,4-difluorophenyl)-ethane,
5of 1-[trans-4-(trans-4-propylcyclohexyl)-cyclohexyl]-2-(p-fluorophenyl)-ethane,
7% of 4-trifluoromethoxy-4'-(trans-4-propylcyclohexyl)-biphenyl,
5% of 4-(trans-4-propylcyclohexyl)-2',3'-difluoro-4'-ethoxytolan and
5% of 4-(trans-4-pentylcylohexyl)-2',3'-difluoro-4'-ethoxytolan
and a chiral component (2-octyl p-(p-n-hexylbenzoyloxy)-)benzoate) shows the following switching times: 114 ms (1/16 D, 1/5 b), 236 ms (1/240 D, 1/14.5 b), $V_{10/0/20}$ 2.35 volt, $V_{90/0/20}$ 2.53 volt and a Δ d/p (d/p window) of 0.20.

EXAMPLE 3

An SLD of the STN type containing a liquid crystal mixture having the following parameters:
 clearing point: 106°
 Δn: 0.1322
 Δε: +6.9
and consisting of a base mixture of
18% of p-trans-4-propylcyclohexane-benzonitrile,
8% of trans-1-p-methoxyphenyl-4-propylcyclohexane,
9% of p-[trans-4-(trans-4-propylcyclohexyl)-cyclohexyl]-trifluoromethoxybenzene,
8% of p-[trans-4-(trans-4-pentylcyclohexyl)-cyclohexyl]-trifluoromethoxybenzene,
8% of 1-[trans-4-(trans-4-propylcyclohexyl)-cyclohexyl]-2-(p-trifluoromethoxyphenyl)-ethane,
7% of 1-[trans-4-(trans-4-pentylcyclohexyl)-cyclohexyl]-2-(p-trifluoromethoxyphenyl)-ethane,
7% of 1-[trans-4-(trans-4-propylcyclohexyl)-cyclohexyl]-2-(3,4-difluorophenyl)-ethane,
6of 1-[trans-4-(trans-4-propylcyclohexyl)-cyclohexyl]-2-(p-fluorophenyl)-ethane,
7% of 1-[trans-4-(trans-4-propylcyclohexyl)-cyclohexyl]-2-(p-trifluoromethylphenyl)-ethane,
7% of 4-trifluoromethoxy-4'-(trans-4-propylcyclohexyl)-biphenyl,
2% of 4-(trans-4-propylcyclohexyl)-4'-methoxytolan,
2% of 4-(trans-4-propylcyclohexyl)-4'-ethoxytolan,
3% of 4-(trans-4-propylcyclohexyl)-4'-propoxytolan,
4% of 4-methyl-4'-ethoxytolan and
4% of 4-ethyl-4'-methoxytolan
and a chiral component (2-octyl p-(p-n-hexylbenzoyloxy)-benzoate) shows short switching times.

EXAMPLE 4

An SLD of the STN type containing a liquid crystal mixture having the following parameters:
 clearing point: 81°
 Δn: 0.1130
 Δε: +6.5
and consisting of a base mixture of
20% of p-trans-4-propylcyclohexane-benzonitrile,
105 of trans-1-p-methoxyphenyl-4-propylcyclohexane,
5.6% of trans-1-p-trifluoromethoxyphenyl-4-propylcyclohexane,
5.6% of trans-1-p-trifluoromethoxyphenyl-4-butylcyclohexane,
5.6% of trans-1-p-trifluoromethoxyphenyl-4-pentylcyclohexane,
7% of p-[trans-4-(trans-4-propylcyclohexyl)-cyclohexyl]-trifluoromethoxybenzene,
6.3% of p-[trans-4-(trans-4-pentylcyclohexyl)-cyclohexyl]-trifluoromethoxybenzene,
6.3% of 1-[trans-4-(trans-4-propylcyclohexyl)-cyclohexyl]-2-(p-trifluoromethoxyphenyl)-ethane,
5.6% of 1-[trans-4-(trans-4-pentylcyclohexyl)-cyclohexyl]-2-(p-trifluoromethoxyphenyl)-ethane,
5.6% of 1-[trans-4-(trans-4-propylcyclohexyl)-cyclohexyl]-2-(3,4-difluorophenyl)-ethane,
5.6% of 1-[trans-4-(trans-4-propylcyclohexyl)-cyclohexyl]-2-(p-trifluoromethyl)-ethane,
7% of 4-trifluoromethoxy-4'-(trans-4-propylcyclohexyl)-biphenyl,
3.5% of 4-(trans-4-propylcyclohexyl)-4'-methoxytolan,
2.8% of 4-(trans-4-propylcyclohexyl)-4'-ethoxytolan and
3.5% of 4-(trans-4-propylcyclohexyl)-4'-propoxytolan
and a chiral component (2-octyl p-(p-n-hexylbenzoyloxy)-benzoate) shows short switching times.

EXAMPLE 5

An SLD of the STN type, containing a liquid crystal mixture having the following parameters:
 clearing point: 73°
 Δn: 0.1252
 Δε: +8.7
and consisting of a base mixture of
20% of p-trans-4-propylcyclohexane-benzonitrile,
10of trans-1-p-methoxyphenyl-4-propylcyclohexane,
5.6% of 2-p-fluorophenyl-5-propylpyrimidine,
5.6% of 2-p-fluorophenyl-5-pentylpyrimidine,
5.6% of 2-p-trifluoromethoxyphenyl-5-pentylpyrimidine,
5.6% of 2-p-trifluoromethoxyphenyl-5-heptylpyrimidine,
7% of p-[trans-4-(trans-4-propylcyclohexyl)-cyclohexyl]-trifluoromethoxybenzene, 6.3% of p-[trans-4-(trans-4-pentylcyclohexyl)-cyclohexyl]-trifluoromethoxybenzene,
6.3% of 1-[trans-4-(trans-4-propylcyclohexyl)-cyclohexyl]-2-(p-trifluoromethoxyphenyl)-ethane,
5.6% of 1-[trans-4-(trans-4-pentylcyclohexyl)-cyclohexyl]-2-(p-trifluoromethoxyphenyl)-ethane,
5.6% of 1-[trans-4-(trans-4-propylcyclohexyl)-cyclohexyl]-2-(3,4-difluorophenyl)-ethane,
5.6% of 1-[trans-4-(trans-4-propylcyclohexyl)-cyclohexyl]-2-(p-trifluoromethyl)-ethane,
3.5% of 4-(trans-4-propylcyclohexyl)-4'-methoxytolan,
3.5% of 4-(trans-4-propylcyclohexyl)-4'-ethoxytolan and
4.2% of 4-(trans-4-propylcyclohexyl)-4'-propoxytolan
and a chiral component (2-octyl p-(p-n-hexylbenzoyloxy-)benzoate) shows short switching times.

In the following table, physical data of further mixtures M1 to M41 according to the invention are given, the composition of which is to be found after the table:

|  |  | c.p. | $V_{10/0/20}$ | $\Delta n$ | $\Delta \epsilon$ |
|---|---|---|---|---|---|
| 89-263 | M1 | 120 | 5.1 | 0.1267 | 1.09 |
| 89-220 | M2 | 89 | 3.0 | 0.1173 |  |
| 89-172 | M3 | 110 | 3.3 | 0.0905 | 2.3 |
| 89-83 | M4 | 93 | 2.1 | 0.1049 | 5.0 |
| 89-70 | M5 | 97 |  | 0.1057 |  |
| 89-25 | M6 | 90 | 3.7 | 0.1159 | 1.6 |
| 89-15 | M7 | 80 | 3.5 | 0.0922 | 1.7 |
| 89-470 | M8 | 90 |  |  |  |
| ZLI-4582 | M9 | 98 | 2.5 | 0.1008 | 3.2 |
| ZLI-4581 | M10 | 94 | 2.2 | 0.1006 | 4.1 |
| ZLI-4580 | M11 | 95 | 2.0 | 0.1050 | 5.2 |
| 89-438 | M12 | 92 |  | 0.1044 | 5.7 |
| 89-374 | M13 | 92 | 4.7 | 0.1132 | 1.2 |
| 89-348 | M14 | 93 |  | 0.0704 |  |
| 89-337 | M15 | 79 |  | 0.1174 | 1.6 |
| 89-425 | M16 | 107 |  | 0.1213 | 5.0 |
| 89-254 | M17 | 92 |  |  | 2.5 |
| 89-796 | M18 | 91.2 |  | 0.153 | 6.2 |
| 89-1081 | M19 | 94 |  | 0.1242 | 8.0 |
| 90-205 | M20 | 87 |  | 0.1250 | 6.4 |
| 90-442 | M21 | 87 |  | 0.1435 | 9.6 |
| 89/1018 | M22 | 85 | 1.92 | 0.1480 |  |
| 89/1020 | M23 | 84 | 1.82 | 0.1458 |  |
| 89/1034 | M24 | 86 | 1.94 | 0.1531 |  |
| 89/1036 | M25 | 96 | 2.24 | 0.1645 |  |
| 89-1037 | M26 | 95 | 2.18 | 0.1648 |  |
| 89-733 | M27 | 80 |  | 0.1255 | 5.5 |
| 89-789 | M28 |  |  |  |  |
| 90-81 | M29 | 90 | 2.06 | 0.1403 | 11.1 |
| 90-499 | M30 | 82 | 1.93 | 0.1427 |  |
| 90-502 | M31 | 84 | 2.01 | 0.1401 | 10.3 |
| 90-515 | M32 | 83 | 1.77 | 0.1405 | 12.3 |
| 90-602 | M33 | 86 | 1.8 | 0.14 |  |
| 90-604 | M34 | 81 | 2.0 | 0.137 |  |
| 90-605 | M35 | 94 | 1.9 | 0.15 |  |
| 90-606 | M36 | 80 | 1.8 | 0.14 |  |
| 90-607 | M37 | 87 | 1.8 | 0.14 |  |
| 90-608 | M38 | 80 | 1.8 | 0.14 |  |
| ZLI-4720-100 | M39 | 91 | 2.3 | 0.1299 | 9.6 |
| 90-609 | M40 | 85 | 2.2 | 0.125 |  |
| 90/2008 | M41 | 76 | 2.15 | 0.1115 |  |
| 90/370 | M42 | 76 | 1.63 | 0.1345 |  |
| 90/371 | M43 | 70 | 1.44 | 0.1065 |  |
| 90/373 | M44 |  | 2.12 | 0.1678 |  |
| 90/409 | M45 | 68 | 1.42 | 0.1306 |  |
| 90/414 | M46 | 74 | 1.44 | 0.1136 |  |
| 90/416 | M47 | 63 | 1.66 | 0.1617 |  |
| 90/411 | M48 | 72 | 1.89 | 0.1306 |  |
| 90/415 | M49 | 78 | 2.07 | 0.1193 |  |
| 90/417 | M50 | 80 | 1.86 | 0.1609 |  |
| 90/2014 | M51 | 71 | 1.70 | 0.1401 | 10.5 |
| 90/2015 | M52 | 76 | 1.91 | 0.1152 | 8.6 |
| 90/487 | M53 | 87 | 1.90 | 0.1401 | 11.4 |

-continued

| 89-263 (M1) |  | 89-220 (M2) |  |
|---|---|---|---|
| D-50CF2 | 30% | PYP-50CF3 | 18% |
| PCH-53 | 11% | PYP-70CF3 | 18% |
| I32 | 16% | PCH-301 | 13% |
| I35 | 10% | CCH-303 | 13% |
| BCH-32 | 9% | CH-35 | 4% |
| CBC-33 | 4% | CH-43 | 4% |
| CBC-53 | 4% | CH-45 | 4% |
| CBC-55 | 4% | CBC-33 | 4% |
| CBC-33F | 4% | CBC-53 | 5% |
| CBC-53F | 5% | CBC-55 | 4% |
| CBC-55F | 3% | CBC-33F | 4% |
|  |  | CBC-53F | 5% |
|  |  | CBC-55F | 4% |
| 89-172 (M3) |  | 89-83 (M4) |  |
| CCP-30CF3 | 20% | PCH-3 | 14% |
| CCP-50CF3 | 20% | PCH-5F | 10% |
| PCH-301 | 15% | PCH-7F | 10% |
| PCH-302 | 10% | PCH-50CF2 | 20% |
| CCH-303 | 10% | ECCP-3F | 6% |
| CCH-501 | 9% | ECCP-5F | 6% |
| CBC-33 | 3% | ECCP-33 | 5% |
| CBC-53 | 4% | CBC-33 | 5% |
| CBC-33F | 3% | CBC-53 | 5% |
| CBC-53F | 3% | CBC-55 | 4% |
| CBC-55F | 3% | CBC-33F | 5% |
|  |  | CBC-53F | 5% |
|  |  | CBC-55F | 5% |
| 89-70 (M5) |  | 89-25 (M6) |  |
| PCH-3 | 14% | PCH-5F | 14% |
| PCH-5F | 14% | PCH-6F | 13% |
| PCH-7F | 14% | PCH-7F | 14% |
| PCH-50CF2 | 10% | I32 | 16% |
| ECCP-3F | 6% | I35 | 10% |
| ECCP-5F | 6% | BCH-32 | 9% |
| ECCP-33 | 5% | CBC-33 | 4% |
| CBC-33 | 5% | CBC-53 | 4% |
| CBC-53 | 5% | CBC-55 | 4% |
| CBC-55 | 5% | CBC-33F | 4% |
| CBC-33F | 5% | CBC-53F | 5% |
| CBC-53F | 6% | CBC-55F | 3% |
| CBC-55F | 5% |  |  |
| 89-15 (M7) |  | 89-470 (M8) |  |
| PCH-30CF2 | 20% | PCH-3 | 18% |
| PCH-50CF2 | 10% | PCH-5F | 12% |
| CCH-303 | 13% | PCH-6F | 12% |
| CCH-502 | 13% | PCH-7F | 10% |
| ECCP-31 | 4% | ECCP-3F.F | 7% |
| ECCP-32 | 4% | ECCP-5F.F | 7% |
| ECCP-33 | 4% | ECCP-33 | 5% |
| ECCP-35 | 4% | CBC-33 | 5% |
| BCH-32 | 9% | CBC-53 | 5% |
| BCH-52 | 9% | CBC-55 | 4% |
| CBC-33F | 4% | CBC-33F | 5% |
| CBC-53F | 3% | CBC-53F | 5% |
| CBC-55F | 3% | CBC-55F | 5% |
| ZLI-4582 (M9) |  | ZLI-4581 (M10) |  |
| PCH-3 | 7% | PCH-3 | 10% |
| PCH-5F | 12% | PCH-5F | 18% |
| PCH-6F | 12% | PCH-6F | 14% |
| PCH-7F | 10% | PCH-7F | 10% |
| ECCP-3F | 7% | ECCP-3F | 9% |
| ECCP-5F | 7% | ECCP-5F | 7% |
| PCH-53 | 8% | ECCP-33 | % |
| ECCP-33 | 5% | CBC-33 | 5% |
| CBC-33 | 5% | CBC-53 | 6% |
| CBC-53 | 6% | CBC-55 | 5% |
| CBC-55 | 5% | CBC-33F | 5% |
| CBC-33F | 5% | CBC-53F | 6% |
| CBC-53F | 6% | CBC-55F | 5% |
| CBC-55F | 5% |  |  |

| ZLI-4580 (M11) | | 89-438 (M12) | |
|---|---|---|---|
| PCH-3 | 18% | PCH-3 | 18% |
| PCH-5F | 12% | PCH-5F | 12% |
| PCH-6F | 12% | PCH-6F | 12% |
| PCH-7F | 10% | PCH-7F | 10% |
| ECCP-3F | 7% | ECCP-3CF3 | 7% |
| ECCP-5F | 7% | ECCP-5CF3 | 7% |
| ECCP-33 | 5% | ECCP-33 | 5% |
| CBC-33 | 5% | CBC-33 | 5% |
| CBC-53 | 5% | CBC-53 | 5% |
| CBC-55 | 4% | CBC-55 | 4% |
| CBC-33F | 5% | CBC-33F | 5% |
| CBC-53F | 5% | CBC-53F | 5% |
| CBC-55F | 5% | CBC-55F | 5% |

| 89-374 (M13) | | 89-348 (M14) | |
|---|---|---|---|
| PCH-5F | 15% | PCH-SF | 10% |
| PCH-7F | 15% | PCH-6F | 5% |
| PCH-53 | 20% | PCH-7F | 10% |
| BCH-32 | 14% | ECCP-3CF3 | 10% |
| BCH-52 | 11% | ECCP-5CF3 | 10% |
| CBC-33 | 3% | CCP-30CF3 | 10% |
| CBC-53 | 4% | CCP-30CF3 | 10% |
| CBC-55 | 4% | CCP-50CF3 | 10% |
| CBC-33F | 5% | ECCP-30CF3 | 10% |
| CBC-53F | 6% | ECCP-50CF3 | 10% |
| CBC-55F | 3% | CBC-53F | 5% |

| 89-227 (M15) | | 89-425 (M16) | |
|---|---|---|---|
| EPCH-20CF3 | 20% | PCH-3 | 16% |
| EPCF-30CF3 | 5% | PCH-5F | 12% |
| EPCH-50CF3 | 5% | PCH-6F | 12% |
| PCH-53 | 11% | PCH-7F | 10% |
| I32 | 16% | ECCP-3F | 6% |
| I35 | 10% | ECCP-5F | 6% |
| BCH-32 | 9% | CPTP-301 | 3% |
| CBC-33 | 4% | CPTP-302 | 3% |
| CBC-53 | 4% | CPTP-303 | 3% |
| CBC-55 | 4% | CBC-33 | 5% |
| CBC-33F | 4% | CBC-53 | 5% |
| CBC-53F | 5% | CBC-55 | 4% |
| CBC-55F | 3% | CBC-33F | 5% |
| | | CBC-53F | 5% |
| | | CBC-55F | 5% |

| 89-254 (M17) | | 89-796 (M18) | |
|---|---|---|---|
| PCH-3 | 6% | PCH-3 | 15% |
| PCH-4 | 4% | PCH-4 | 10% |
| CCP-30CF3 | 7.5% | PCH-301 | 16% |
| CCP-50CF3 | 2.5% | PCH-302 | 10% |
| PCH-302 | 15% | PTP-40F | 23% |
| PCH-304 | 13% | CBC-33F | 4% |
| PCH-402 | 8% | CBC-53F | 5% |
| PCH-501 | 9% | CBC-55F | 4% |
| PCH-502 | 5% | CBC-33 | 4% |
| CP-33 | 5% | CBC-53 | 5% |
| CP-35 | 5% | CBC-55 | 4% |
| CP-43 | 5% | | |
| CP-45 | 5% | | |
| CBC-33 | 3% | | |
| CBC-53 | 5% | | |
| CBC-55 | 2% | | |

| 89-1081 (M19) | | 90-205 (M20) | |
|---|---|---|---|
| PCH-3 | 16% | PCH-3 | 16% |
| PTP-40F | 9% | PTP-40F | 9% |
| PTP-50F | 10% | PTP-50F | 10% |
| ECCP-3F | 5% | cCP-20CF3 | 7% |
| ECCP-5F | 7% | CCP-30CF3 | 7% |
| CCP-20CF3 | 7% | CCP-40CF3 | 7% |
| CCP-30CF3 | 7% | CCP-50CF3 | 7% |
| CCP-40CF3 | 7% | ECCP-30CF3 | 4% |
| CCP-50CF3 | 7% | ECCP-50CF3 | 4% |
| | | ECCP-3FF | 5% |
| ECCP-30CF3 | 6% | | |
| ECCP-50CF3 | 6% | ECCP-5F.F | 4% |
| ECCP-3F.F | 8% | D-302FF | 7% |
| ECCP-5F.F | 7% | D-502FF | 6% |

| 90-442 (M21) | | CP-302FF | 7% |
|---|---|---|---|
| | | 89/1018 (M22) | |
| PCH-2 | 4% | PCH-3 | 22% |
| PCH-3 | 17% | PCH-4 | 18% |
| PCH-4 | 12% | PTP-70F | 6% |
| FCH-5 | 11% | PTP-102 | 5% |
| CCP-30CF3 | 7% | PTP-201 | 7% |
| CCP-50CF3 | 6% | CP-3F | 10% |
| ECCP-31 | 4% | CP-5F | 8% |
| ECCP-32 | 4% | ECCP-3F | 4% |
| ECCP-3F | 6% | BCH-32 | 10% |
| ECCP-5F | 6% | BCH-5.F2 | 10% |
| CPTP-301 | 5% | | |
| CPTP-302 | 5% | | |
| PTP-40F | 7% | | |
| PTP-50F | 6% | | |

| 89/1020 (M23) | | 89/1034 (M24) | |
|---|---|---|---|
| PCH-3 | 22% | PCH-3 | 22% |
| PCH-4 | 17% | PCH-4 | 16% |
| K6 | 9% | K6 | 2% |
| K9 | 3% | PTP-40F | 8% |
| PTP-70F | 6% | PTP-102 | 4% |
| CP-3F | 10% | PTP-201 | 5% |
| CP-5F | 9% | CP-3F | 10% |
| ECCP-3F | 9% | CP-5F | 8% |
| CPTP-301 | 5% | ECCP-3F | 5% |
| CPTP-302 | 4% | BCH-32 | 8% |
| | | BCH-5.F2 | 10% |
| | | CPTP-301 | 2% |

| 89/1036 (M25) | | 89/1037 (M26) | |
|---|---|---|---|
| PCH-3 | 21% | PCH-3 | 15% |
| K6 | 6% | K6 | 6% |
| PTP-40F | 8% | K9 | 6% |
| PTP-102 | 6% | PTP-40F | 8% |
| PTP-201 | 7% | PTP-102 | 4% |
| CP-3F | 10% | PTP-201 | 6% |
| CP-5F | 10% | PCH-302 | 3% |
| ECCP-3F | 11% | CP-3F | 10% |
| BCH-32 | 10% | CP-5F | 10% |
| BCH-5.F2 | 11% | ECCP-3F | 11% |
| | | BCH-32 | 10% |
| | | BCH-5.F2 | 11% |

| 89-733 (M27) | | 89-789 (M28) | |
|---|---|---|---|
| PCH-3 | 21% | PCH-3 | 18% |
| K6 | 6% | PCH-5F | 12% |
| PTP-40F | 8% | PCH-6F | 12% |
| PTP-35 | 7% | PCH-7F | 10% |
| PTP-201 | 7% | PTP-40F | 14% |
| CP-3F | 10% | ECCP-33 | 5% |
| CP-5F | 8% | CBC-33 | 5% |
| ECCP-3F | 12% | CBC-53 | 5% |
| BCH-32 | 10% | CBC-55 | 4% |
| BCH-5.F2 | 11% | CBC-55 | 4% |
| | | CBC-33F | 5% |
| | | CBC-53F | 5% |
| | | CBC-55F | 5% |

| 9081 (M29) | | 90-499 (M30) | |
|---|---|---|---|
| PCH-2 | 7% | PCH-3 | 18% |
| PCH-3 | 18% | PCH-4 | 8% |
| PCH-4 | 14% | PCH-5 | 10% |
| PCH-5 | 15% | PCH-301 | 13% |
| PCH-7 | 7% | ME2N.F | 3% |
| BCH-32 | 10% | ME3N.F | 3% |
| CPTP-301 | 4% | PTP-102 | 3% |
| CPTP-302 | 3% | PTP-201 | 4% |
| CPTP-303 | 3% | CPTP-301 | 4% |
| ECCP-3 | 7% | CPTP-302 | 4% |
| ECCP-3F | 6% | CPTP-303 | 4% |
| ECCP-5F | 6% | ECCP-3F | 6% |
| | | ECCP-5F | 6% |
| | | ECCP-31 | 3% |
| | | ECCP-32 | 2% |
| | | CCP-30CF3 | 5% |
| | | CCP-50FF3 | 4% |

| 90502 (M31) | | 90-515 (M32) | |
|---|---|---|---|
| PCH-3 | 18% | PCH-3 | 18% |
| PCH-4 | 8% | PCH-4 | 8% |
| PCH-5 | 10% | PCH-5 | 10% |
| PCH-301 | 11% | PCH-301 | 8% |
| ME2N.F | 3% | ME2N.F | 3% |
| ME3N.F | 3% | ME3N.F | 3% |
| PTP-102 | 4% | ME5N.F | 5% |
| PTP-201 | 3% | PTP-102 | 5% |
| CPTP-301 | 3% | CPTP-301 | 3% |
| CPTP-302 | 4% | CPTP-302 | 4% |
| CPTP-303 | 3% | CPTP-303 | 3% |
| ECCP-3F | 6% | ECCP-3F | 6% |
| ECCP-5F | 6% | ECPP-5F | 6% |
| ECCP-31 | 5% | ECCP-31 | 5% |
| ECCP-32 | 4% | ECCP-32 | 4% |
| CCP-30CF3 | 5% | CCP-30CF3 | 5% |
| CCP-50CF3 | 4% | CCP-50CF3 | 4% |
| 90-602 (M33) | | 90-604 (M34) | |
| PCH-2 | 5% | PCH-2 | 5% |
| PCH-3 | 15% | PCH-3 | 15% |
| PCH-4 | 11% | PCH-4 | 11% |
| PCH-5 | 21% | PCH-5 | 21% |
| PCH-7 | 11% | PCH-32 | 5% |
| PCH-32 | 5% | FET-3F | 14% |
| CFET-3F | 12% | FET-5F | 11% |
| CFET-5F | 10% | CBC-33 | 6% |
| CBC-33 | 4% | CBC-53 | 6% |
| CBC-53 | 6% | CBC-55 | 6% |
| 90-605 (M35) | | 90-606 (M36) | |
| PCH-3 | 15% | PCH-3 | 15% |
| PCH-4 | 11% | PCH-4 | 11% |
| PCH-5 | 21% | PCH-5 | 21% |
| PCH-7 | 11% | PCH-7 | 11% |
| CFET-3F | 12% | PCH-32 | 5% |
| CFET-5F | 10% | CFET-3F | 8% |
| FET-3F | 5% | CFET-5F | 6% |
| FET-5F | 5% | FET-3F | 7% |
| CBC-33 | 4% | FET-5F | 7% |
| CBC-53 | 6% | CBC-33 | 4% |
| | | CBC-53 | 5% |
| 90-607 (M37) | | 90-608 (M38) | |
| PCH-2 | 5% | PCH-2 | 5% |
| PCH-3 | 15% | PCH-3 | 15% |
| PCH-4 | 11% | PCH-4 | 11% |
| PCH-5 | 21% | PCH-5 | 21% |
| PCH-7 | 11% | PCH-7 | 11% |
| | | PCH-32 | 5% |
| PCH-32 | 5% | | |
| CFET-3F | 12% | CPTP-30CF3 | 12% |
| CFET-3F.F | 10% | CPTP-50CF3 | 10% |
| CBC-33 | 4% | CBC-33 | 4% |
| CBC-53 | 6% | CBC-53 | 6% |
| ZLI-4720-100 (M 39) | | 90609 (M 40) | |
| PCH-3 | 18% | PCH-3 | 18% |
| PCH-4 | 14% | PCH-4 | 14% |
| PCH-5 | 12% | PCH-5 | 12% |
| PCH-7 | 8% | PCH-7 | 8% |
| PTP-102 | 3% | PTP-20F | 3% |
| PTP-201 | 3% | PTP-40F | 3% |
| CPTP-302 | 3% | CPTP-30CF3 | 3% |
| ECCP-31 | 4% | ECCP-31 | 4% |
| ECCP-32 | 5% | ECCP-32 | 5% |
| ECCP-33 | 5% | ECCP-33 | 5% |
| ECCP-35 | 4% | ECCP-35 | 4% |
| ECCP-3 | 7% | ECCP-3 | 7% |
| ECCP-3F | 7% | ECCP-3F | 7% |
| ECCP-5F | 7% | ECCP-5F | 7% |
| 90/2008 (M 41) | | 90/370 (M 42) | |
| PCH-3 | 10% | PYP-3F | 7% |
| PYP-3F | 10% | PCH-3 | 11% |
| PYP-5F | 9% | PCH-5 | 10% |
| PCH-5F | 9% | PCH-7 | 10% |
| PCH-7F | 9% | PTP-35 | 16% |
| ECCP-3F | 13% | CPTP-303 | 4% |
| ECCP-5F | 12% | CCP-20CF3 | 15% |
| CP-3F | 9% | CCP-30CF3 | 21% |
| CP-5F | 9% | CCP-50CF3 | 6% |
| CPTP-301 | 5% | | |
| CPTP-303 | 5% | | |
| 90/371 (M 43) | | 90/373 (M 44) | |
| PYP-3F | 7% | PYP-3F | 7% |
| PCH-3 | 11% | PCH-3 | 9% |
| PCH-5 | 10% | PCH-5 | 10% |
| PCH-7 | 10% | PCH-7 | 9% |
| PCH-301 | 16% | PTP-35 | 15% |
| CPTP-303 | 4% | PTP-45 | 19% |
| CCP-20CF3 | 15% | CPTP-303 | 4% |
| CCP-30CF3 | 21% | BCH-32 | 14% |
| CCP-50CF3 | 6% | BCH-52F | 13% |
| 90/409 (M 45) | | 90/414 (M 46) | |
| PYP-3F | 7% | PYP-3F | 7% |
| PCH-3 | 21% | PCH-3 | 11% |
| PCH-5 | 10% | PCH-5 | 10% |
| PCH-7 | 10% | PCH-7 | 10% |
| PCH-301 | 10% | PCH-301 | 13% |
| PTP-102 | 4% | CPTP-303 | 4% |
| PTP-201 | 4% | PTP-102 | 3% |
| CPTP-303 | 6% | CCP-20CF3 | 10% |
| CCP-20CF3 | 8% | CCP-30CF3 | 11% |
| CCP-30CF3 | 8% | CCP-40CF3 | 10% |
| CCP-40CF3 | 6% | CCP-50CF3 | 11% |
| CCP-50CF3 | 6% | | |
| 90/416 (M 47) | | 90/411 (M 48) | |
| PYP-3F | 10% | PYP-3F | 7% |
| K6 | 10% | PCH-3 | 21% |
| PCH-3 | 11% | PCH-5 | 10% |
| PCH-5 | 10% | PCH-7 | 10% |
| PCH-7 | 10% | PCH-301 | 10% |
| PCH-301 | 12% | PTP-102 | 4% |
| PTP-35 | 5% | PTP-201 | 3% |
| PTP-102 | 5% | CPTP-303 | 6% |
| CPTP-302 | 5% | CCP-30CF3 | 10% |
| CPTP-303 | 5% | CCP-50CF3 | 10% |
| BCH-32 | 8% | ECCP-32 | 4% |
| BCH-52F | 9% | ECCP-33 | 5% |
| 90/415 (M 49) | | 90/417 (M 50) | |
| PYP-3F | 6% | PYP-3F | 4% |
| PCH-3 | 14% | PCH-3 | 22% |
| PCH-5 | 10% | PCH-5 | 11% |
| PCH-7 | 10% | PCH-7 | 13% |
| PCH-301 | 13% | PCH-301 | 11% |
| CPTP-303 | 4% | PTP-102 | 5% |
| PTP-102 | 4% | PTP-201 | 4% |
| CCP-30CF3 | 11% | CPTP-301 | 4% |
| CCP-50CF3 | 11% | CPTP-302 | 3% |
| ECCP-32 | 9% | CPTP-303 | 5% |
| ECCP-33 | 8% | BCH-32 | 10% |
| | | BCH-52F | 8% |
| 90/2014 (M51) | | 90/2015 (M52) | |
| K6 | 7.0 | PCH-3 | 21.0 |
| PCH-3 | 28.0 | PCH-5 | 10.0 |
| PCH-5 | 13.0 | PCH-7F | 15.0 |
| PCH-301 | 11.0 | CCP-20CF3 | 12.0 |
| CCP-20CF3 | 8.0 | CCP-30CF3 | 13.0 |
| CCP-30CF3 | 8.0 | CCP-40CF3 | 10.0 |
| CCP-40CF3 | 5.0 | CCP-50CF3 | 8.0 |
| CCP-50CF3 | 6.0 | PTP-102 | 7.0 |
| PTP-102 | 3.0 | CPTP-301 | 4.0 |
| CPTP-301 | 6.0 | | |
| 90/487 (M53) | | | |
| PCH-3 | 18.0 | | |
| PCH-4 | 14.0 | | |
| PCH-5 | 11.0 | | |
| ME2N.F | 3.0 | | |
| ME3N.F | 4.0 | | |
| D-302 | 5.0 | | |
| D-402 | 5.0 | | |

| | |
|---|---|
| PTP-102 | 4.0 |
| CPTP-301 | 4.0 |
| CPTP-302 | 4.0 |
| CPTP-303 | 3.0 |
| ECCP-3F | 6.0 |
| ECCP-5F | 6.0 |
| ECCP-31 | 6.0 |
| ECCP-32 | 7.0 |

| | |
|---|---|
| PCH-53: | trans-1-p-propylphenyl-4-pentylcyclohexane |
| I-32: | 1-(trans-4-propylcyclohexyl)-2-(4'-ethyl-2'-fluorobiphenyl-4-yl)-ethane |
| I-35: | 1-(trans-4-propylcyclohexyl)-2-(4'-pentyl-2'-fluorobiphenyl-4-yl)-ethane |
| BCH-32: | 4-ethyl-4'-(trans-4-propylcyclohexyl)-biphenyl |
| BCH-52: | 4-ethyl-4'-(trans-4-pentylcylcohexyl)-biphenyl (sic) |
| CCH-303: | trans,trans-4-propoxy-4'-propylcyclohexyl-cyclohexane |
| CCH-501: | trans,trans-4-methoxy-4'-pentylcyclohexyl-cyclohexane |
| CH-35: | trans-4-pentylcyclohexyl trans,trans-4-propylcyclohexylcyclohexanecarboxylate |
| CH-43: | trans-4-propylcyclohexyl trans,trans-4-butylcyclohexylcyclohexanecarboxylate |
| CH-45: | trans-4-pentylcyclohexyl trans,trans-4-butylcyclohexylcyclohexanecarboxylate |
| PCH-302: | trans-1-p-ethoxyphenyl-4-propylcyclohexane |
| PCH:303: | trans-1-p-propoxyphenyl-4-propylcyclohexane |
| PCH-304: | trans-1-p-butoxyphenyl-4-propylcyclohexane |
| CCH-502: | trans,trans-4-ethoxy-4'-pentylcyclohexyl-cyclohexane |
| ECCP-32: | 1-[trans-4-(trans-4-propylcyclohexyl)-cyclohexyl]-2-(p-ethylphenyl)-ethane |
| ECCP-31: | 1-[trans-4-(trans-4-propylcyclohexyl)-cyclohexyl]-2-(p-methylphenyl)-ethane |
| ECCP-35: | 1-[trans-4-(trans-4-propylcyclohexyl)-cyclohexyl]-2-(p-pentylphenyl)-ethane |
| PCH-501: | trans-1-p-methoxyphenyl-4-pentylcyclohexane |
| PCH-502: | trans-1-p-ethoxyphenyl-4-pentylcyclohexane |
| CP-33: | p-propylphenyl trans,trans-4-propylcyclohexylcyclohexanecarboxylate |
| CP-35: | p-pentylphenyl trans,trans-4-propylcyclohexylcyclohexanecarboxylate |
| CP-43: | p-propylphenyl trans,trans-4-butylcyclohexylcyclohexanecarboxylate |
| CP-45: | p-pentylphenyl trans,trans-4-butylcyclohexylcyclohexanecarboxylate |
| PTP-40F: | 4-butoxy-4'-fluorotolan |
| PTP-50F: | 4-pentoxy-4'-fluorotolan |
| PTP-70F: | 4-heptoxy-4'-fluorotolan |
| PCH-301: | trans-1-p-methoxyphenyl-4-propylcyclohexane |
| CCH-301: | trans,trans-4-methoxy-4'-propylcyclohexyl-cyclohexane |
| CBC-33F: | 4,4'-bis-(trans-4-propylcyclohexyl)-2-fluorobiphenyl |
| CBE-55F: | 4,4'-bis-(trans-4-pentylcyclohexyl)-2-fluorobiphenyl |
| CBC-53F: | 4-(trans-4-pentylcyclohexyl)-4'-(trans-4-propylcyclcohexyl)-2-fluorobiphenyl (sic) |
| CBC-33: | 4'4'-bis-(trans-4-propylcyclohexyl)-biphenyl |
| CBC-55: | 4,4'-bis-(trans-4-pentylcyclohexyl)-biphenyl |
| CBC-53: | 4-(trans-4-pentylcyclohexyl)-4'-(trans-4-propylcyclohexyl)-biphenyl |
| ECCP-33: | 1-[trans-4-(trans-4-propylcyclohexyl)-cyclohexyl]-2-(p-propylphenyl)-ethane |
| CCH-51F: | trans,trans-4-fluoromethyl-4'-pentylcyclohexylcyclohexane |
| CCH-31F: | trans,trans-4-fluoromethyl-4'-propylcyclohexylcyclohexane |
| PTP-102: | 4-methyl-4'-ethoxy-tolan |
| PTP-201: | 4-methoxy-4'-ethyl-tolan |
| CPTP-301: | 4-(trans-4-propylcyclohexyl)-4'-methoxytolan |
| CPTP-302: | 4-(trans-4-propylcyclohexyl)-4'-ethoxytolan |
| CPTP-303: | 4-(trans-4-propylcyclohexyl)-4'-propoxytolan |
| PCH-5F: | trans-1-p-fluorophenyl-4-pentylcyclohexane |
| PCH-6F: | trans-1-p-fluorophenyl-4-hexylcyclohexane |
| PCH-7F: | trans-1-p-fluorophenyl-4-heptylcyclohexane |
| EPCH-20CF$_3$: | 1-(trans-4-ethylcyclohexyl)-2-(p-trifluoromethoxyphenyl)-ethane |
| EPCH-30CF$_3$: | 1-(trans-4-propylcyclohexyl)-2-(p-trifluoromethoxyphenyl)-ethane |
| EPCH-50CF$_3$: | 1-(trans-4-pentylcyclohexyl)-2-(p-trifluoromethoxyphenyl)-ethane |
| EPCH-70CF$_3$: | 1-(trans-4-heptylcyclohexyl)-2-(p-trifluoromethoxyphenyl)-ethane |
| PCH-30CF$_3$: | trans-1-p-trifluoromethoxyphenyl-4-propylcyclohexane |
| PCH-50CF$_3$: | trans-1-p-trifluoromethoxyphenyl-4-pentylcyclohexane |
| ECCP-30CF$_3$: | 1-[trans-4-(trans-4-propylcyclohexyl)-cyclohexyl]-2-(p-trifluoromethoxyphenyl)-ethane |
| ECCP-50CF$_3$: | 1-[trans-4-(trans-4-pentylcyclohexyl)-cyclohexyl]-2-(p-trifluoromethoxyphenyl)-ethane |
| CCP-20CF$_3$: | p-[trans-4-(trans-4-ethylcyclohexyl)-cyclohexyl]-trifluoromethoxybenzene |
| CCP-30CF$_3$: | p-[trans-4-(trans-4-propylcyclohexyl)-cyclohexyl]-trifluoromethoxybenzene |
| CCP-40CF$_3$: | p-[trans-4-(trans-4-butylcyclohexyl)-cyclohexyl]-trifluoromethoxybenzene |
| CCP-50CF$_3$: | p-[trans-4-(trans-4-pentylcyclohexyl)-cyclohexyl]-trifluoromethoxybenzene |
| BCH-30CF$_3$: | 4-trifluoromethoxy-4'-(trans-4-propylcyclohexyl)-biphenyl |
| ECCP-3F.F: | 1-[trans-4-(trans-4-propylcyclohexyl)-cyclohexyl]-2-(3,4-difluorophenyl)-ethane |
| ECCP-5F.F: | 1-[trans-4-(trans-4-pentylcyclohexyl)-cyclohexyl]-2-(3,4-difluorophenyl)-ethane |
| CCP-3F.F: | 4-[trans-4-(trans-4-propylcyclohexyl)-cyclohexyl]-1,2-difluorobenzene |
| CCP-5F.F: | 4-[trans-4-(trans-4-pentylcyclohexyl)-cyclohexyl]-1,2-difluorobenzene |
| D-302FF: | 2,3-difluoro-4-ethoxyphenyl trans-4-propylcyclohexylcarboxylate |
| D-502FF: | 2,3-difluoro-4-ethoxyphenyl trans-4-pentylcyclohexylcarboxylate |
| CCP-3F: | 4-[trans-4-(trans-4-propylcyclohexyl)-cyclohexyl]-fluorobenzene |
| ECCP-3F: | 1-[trans-4-(trans-4-propylcyclohexyl)-cyclohexyl]-2-(p-fluorophenyl)-ethane |
| ECCP-5F: | 1-[trans-4-(trans-4-pentylcyclohexyl)-cyclohexyl]-2-(p-fluorophenyl)-ethane |
| CP-3F: | p-fluorophenyl trans-4-(trans-4-propylcyclohexyl)-cyclohexanecarboxylate |
| CP-5F: | p-fluorophenyl trans-4-(trans-4-pentylcyclohexyl)-cyclohexanecarboxylate |
| PYP-5F: | 2-p-fluorophenyl-5-pentylpyrimidine |
| PYP-6F: | 2-p-fluorophenyl-5-hexylpyrimidine |
| PYP-7F: | 2-p-fluorophenyl-5-heptylpyrimidine |
| PYP-30CF$_3$: | 2-p-trifluoromethoxyphenyl-5-propylpyrimidine |
| PYP-50CF$_3$: | 2-p-trifluoromethoxyphenyl-5-pentylpyrimidine |
| PYP-70CF$_3$: | 2-p-trifluoromethoxyphenyl-5-heptylpyrimidine |
| PCH-3: | p-trans-4-propylcyclohexyl-benzonitrile |
| PCH-4: | p-trans-4-butylcyclohexyl-benzonitrile |
| PCH-5: | p-trans-4-pentylcyclohexyl-benzonitrile |
| ECCP-3: | 1-[trans-4-(trans-4-propylcyclohexyl)-cyclohexyl]-2-(p-cyanophenyl)-ethane |
| ECCP-3CF$_3$: | 1-[trans-4-(trans-4-propylcyclohexyl)-cyclohexyl]-2-(p-trifluoromethylphenyl)-ethane |
| ECCP-5CF$_3$: | 1-[trans-4-(trans-4-pentylcyclohexyl)-cyclohexyl]-2-(p-trifluoromethylphenyl)-ethane |
| PYP-5N.F: | 2-(3-fluoro-4-cyanophenyl)-5-pentylpyrimidine |
| PYP-7N.F: | 2-(3-fluoro-4-cyanophenyl)-5-heptyl- |

| | |
|---|---|
| | pyrimidine |
| PCH-30CF$_2$: | trans-1-p-difluoromethoxyphenyl-4-propyl-cyclohexane |
| PCH-50CF$_2$: | trans-1-p-difluoromethoxyphenyl-4-pentyl-cyclohexane |
| PCH-3-OCF$_2$: | trans-1-p-difluoromethoxyphenyl-4-propyl-cyclohexane |
| BCH-5.F2: | 4-(trans-4-pentylcyclohexyl)-2'-fluoro-4'-ethylbiphenyl |
| K6: | 4-ethyl-4'-cyanobiphenyl |
| K9: | 4-propyl-4'-cyanobiphenyl |
| PTP-35: | 4-propyl-4'-pentyltolane |
| ME2N.F: | 3-fluoro-4-cyanophenyl 4-ethylbenzoate |
| ME3N.F: | 3-fluoro-4-cyanophenyl 4-propylbenzoate |
| ME5N.F: | 3-fluoro-4-cyanophenyl 4-pentylbenzoate |
| PCH-2: | p-trans-4-ethylcyclohexylbenzonitrile |
| PCH-7: | p-trans-4-heptylcyclohexylbenzonitrile |
| PCH-32: | trans-1-p-ethylphenyl-4-propylcyclohexane |
| CFET-3F: | 1-(4-(trans-4-propylcyclohexyl)-2-fluoro-4'-yl-biphenyl)-2-(4-fluorophenyl)-ethane |
| CFET-5F: | 1-(4-(trans-4-pentylcyclohexyl)-2-fluoro-4'-yl-biphenyl)-2-(4-fluorophenyl)-ethane |
| FET-3F: | 1-(2-fluoro-4-propyl-4'-yl-biphenyl)-2-(4-fluorophenyl)-ethane |
| FET-5F: | 1-(2-fluoro-4-pentyl-4'-yl-biphenyl)-2-(4-fluorophenyl)-ethane |
| CPTP-30CF3: | 4-(trans-4-propylcylcohexyl)-4'-trifluoro-methoxy-tolane |
| CPTP-50CF3: | 4-trans-4-pentylcylcohexyl)-4'-trifluoro-methoxy-tolane |
| PTP-20F: | 4-ethoxy-4'-fluorotolane |
| PYP-3F: | 2-(4-fluorophenyl)-5-propylpyrimidine |
| PTP35: | 4-propyl-4'-pentyltolane |
| PTP45: | 4-butyl-4'-pentyltolane |
| BCH-52F: | 4-(trans-4-pentylcyclohexyl)-2-fluoro-4'-ethylbiphenyl |
| CP-302FF: | 2,3-difluoro-4-ethoxyphenyl trans-4-(trans-4-propylcyclohexyl)-cyclohexane-carboxylate |
| PCH-301: | trans-1-p-methoxyphenyl-4-propylcyclohexane |
| PCH-401: | trans-1-p-methoxyphenyl-4-butylcyclohexane |
| D-302: | 4-ethoxyphenyl trans-4-propylcyclohexyl-carboxylate |
| D-402: | 4-ethoxyphenyl trans-4-butylcyclohexyl-carboxylate |

We claim:

1. Supertwist liquid crystal display with two plane-parallel carrier plates which, with a frame, form a cell, a nematic liquid crystal mixture, located in the cell, having a positive dielectric anisotropy, electrode layers with superposed orientation layers on the insides of the carrier plates, a tilt angle of about 1 degree to 30 degrees between the longitudinal axis of the molecules at the surface of the carrier plates and the carrier plates, and a twist angle of the liquid crystal mixture in the cell from orientation layer to orientation layer of an amount between 100° and 600°, characterized in that the nematic liquid crystal mixture consists of a) component A containing one or more compounds selected from group A consisting of compounds of the formulae IIa to IIk:

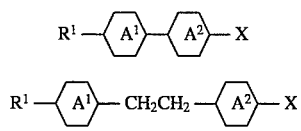

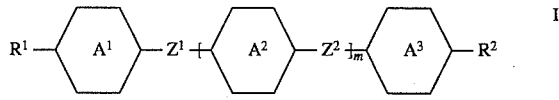

in which

R$^1$ is n-alkyl or n-alkenyl having up to 9 C atoms, X is cyano, —NCS, F, Cl, —CF$_3$, —CHF$_2$, —OCF$_3$, —OCHF$_2$, —OCF$_2$CF$_2$H or —OC$_2$F$_5$, and the rings A$^1$, A$^2$ and A$^3$ each independently of one another are 1,4-phenylene, 2- or 3-fluoro-1,4-phenylene or trans-1,4-cyclohexylene, or one of the rings A$^1$, A$^2$ and A$^3$ is 1,4-cyclohexenylene, pyridine-2,5-diyl or pyrimidine-2,5-diyl, b) 0–40% by weight of a liquid-crystalline component B, consisting of one or more compounds having a dielectric anisotropy from −1.5 to +1.5, of the general formula I $$R^1 - \left( A^1 \right) - Z^1 + \left( A^2 \right) - Z^2 +_m \left( A^3 \right) - R^2 \quad \text{I}$$

in which

R$^1$ and R$^2$ each independently of one another are n-alkyl, n-alkoxy, n-oxaalkyl, ω-fluoroalkyl or n-alkenyl having up to 9 C atoms, the rings A$^1$, A$^2$ and A$^3$ each independently of one another are 1,4-phenylene, 2- or 3-fluoro-1,4-phenylene, trans-1,4-cyclohexylene or 1,4-cyclohexenylene, Z$^1$ and Z$^2$ each independently of one another are —CH$_2$CH$_2$—, —C≡C— or a single bond, and m is 0, 1 or 2 c) an optically active component D in such a quantity that the ratio of cell thickness (spacing of the plane-parallel carrier plates) to the natural pitch of the chiral nematic liquid crystal mixture is about 0.2 to 1.3, and in that the nematic liquid crystal mixture has a nematic phase range of at least 60° C., a viscosity of not more than 35 mPa.s, an optical birefringance ($\Delta$n) of at least 0.1115 and a dielectric anisotropy of at least +1 at 20° C.

2. Display according to claim 1, characterized in that X is F, Cl, CF$_3$, —OCF$_3$, —OCHF$_2$ or —CHF$_2$.

3. A display according to claim 1, characterized in that component A consists of compounds selected from the group consisting of compounds of the formulae IIa to IIf

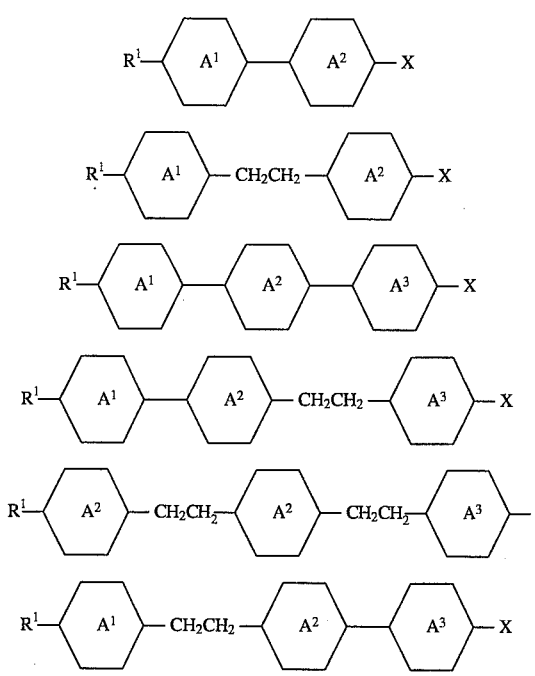

wherein $R^1$, X, $A^1$, $A^2$ and $A^3$ are as defined in claim 1.

4. A display according to claim 3, wherein the nematic liquid crystal mixture has a dielectric anisotropy of at least +5.

5. Display according to claim 4, characterized in that group A comprises compounds selected from the group consisting of IIg, IIh, IIi, IIj and IIk.

6. Display according to claim 4, characterized in that at least one component selected from group B comprises compounds selected from the group consisting of formulae AI to AVI:

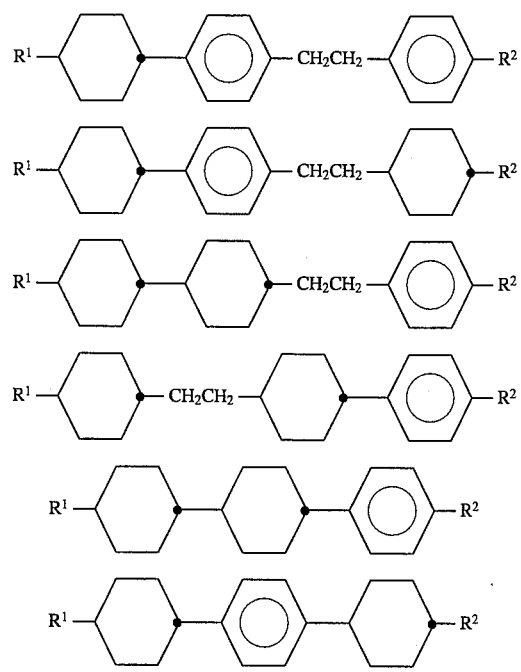

in which $R^1$ and $R^2$ each independently of one another are R and R is alkyl having 1–12 C atoms, and in which one or two non-adjacent $CH_2$ groups can also be replaced by —O—, —CH=CH—, —CO—, —O—CO— or —CO—O— is present.

7. A display according to claim 4, characterized in that at least compound selected from the group consisting of formulae BVI and BVIII:

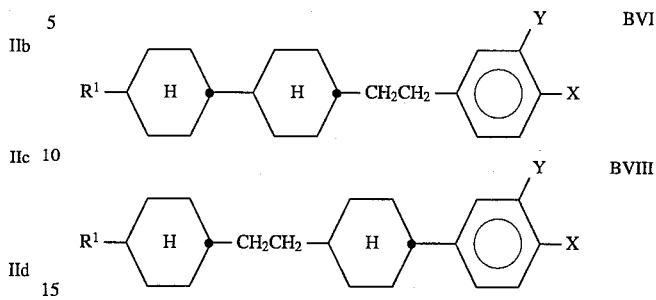

in which,

X being CN or F and Y being H or F, is present.

8. Display according to claim 4, characterized in that tolanes of the following formulae are present:

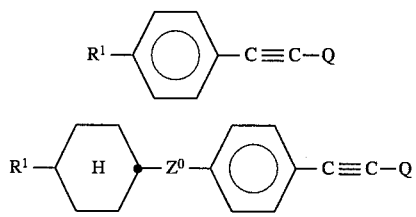

$R^1$ is preferably n-alkyl or n-alkoxy having 1 to 7 C atoms, $Z^0$ is —$CH_2CH_2$— or a single bond, Q is

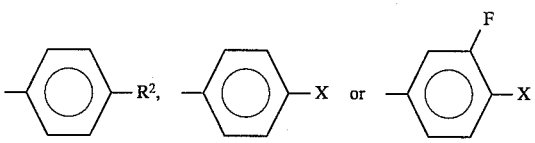

X being F, Cl or $OCF_3$, $R^2$ being n-alkyl or n-alkoxy each having 1 to 7 C atoms or n-alkenyl or n-alkenyloxy each having 3 to 7 C atoms.

9. Display according to claim 4, characterized in that Component B additionally contains one or more compounds selected from the group consisting of II8 to II20:

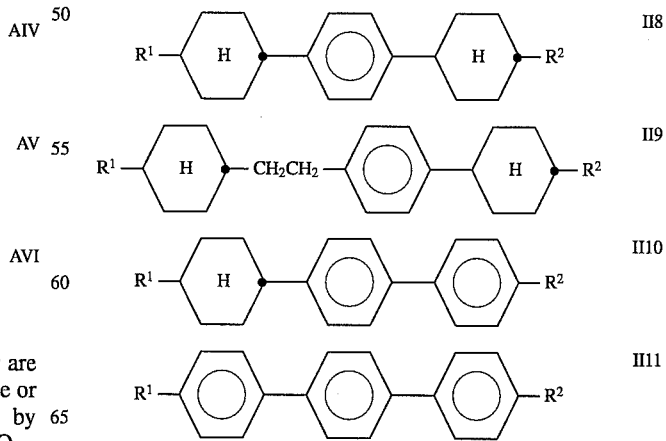

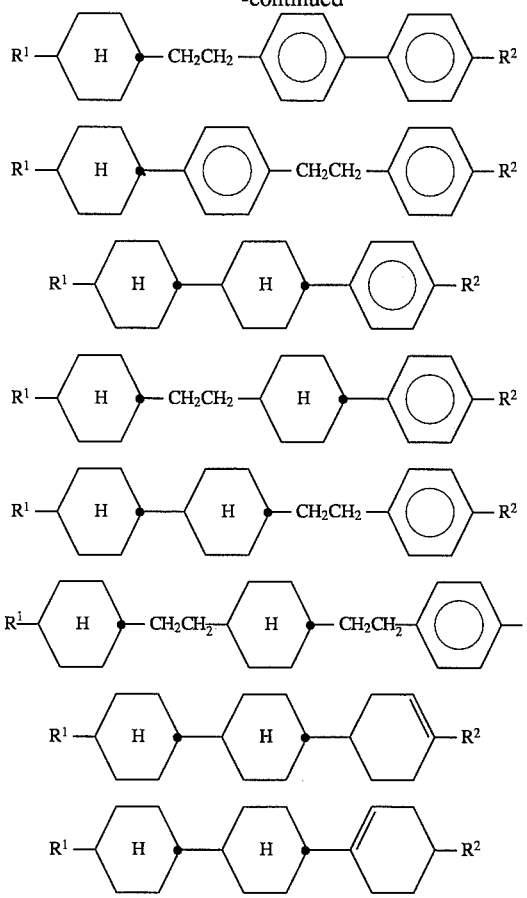
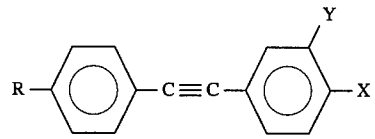
10. Display according to claim 4, characterized in that component A comprises at least one compound of the formula
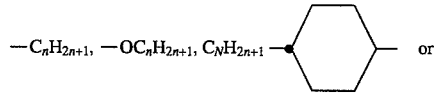
in which
R is
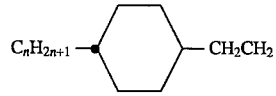
n is an integer of 1–15;
Y is H or F and
X is F, Cl or $OCF_3$.
* * * * *